United States Patent
Peers et al.

(10) Patent No.: US 10,829,092 B2
(45) Date of Patent: Nov. 10, 2020

(54) WIPER BLADE WITH MODULAR MOUNTING BASE

(71) Applicant: Pylon Manufacturing Corp., Deerfield Beach, FL (US)

(72) Inventors: Robert Peter Peers, Boca Raton, FL (US); Hiroshi Kawashima, Sunrise, FL (US)

( * ) Notice: Subject to any disclaimer, the term of this patent is extended or adjusted under 35 U.S.C. 154(b) by 1332 days.

(21) Appl. No.: 14/035,610

(22) Filed: Sep. 24, 2013

(65) Prior Publication Data

US 2014/0082875 A1    Mar. 27, 2014

Related U.S. Application Data

(60) Provisional application No. 61/704,855, filed on Sep. 24, 2012.

(51) Int. Cl.
*B60S 1/40* (2006.01)
*B60S 1/38* (2006.01)

(52) U.S. Cl.
CPC ........... *B60S 1/4003* (2013.01); *B60S 1/3801* (2013.01); *B60S 1/4064* (2013.01); *B60S 2001/4093* (2013.01)

(58) Field of Classification Search
CPC .... B60S 1/3801; B60S 1/3849; B60S 1/3851; B60S 1/3853; B60S 1/3858; B60S 2001/3813; B60S 1/4003; B60S 1/4064; B60S 2001/4093
USPC .......................... 15/250.44, 250.32, 250.361
See application file for complete search history.

(56) References Cited

U.S. PATENT DOCUMENTS

| | | |
|---|---|---|
| D56,762 S | 12/1920 | Minier |
| 2,310,751 A | 2/1943 | Scinta |
| 2,550,094 A | 4/1951 | Smulski |
| 2,589,339 A | 3/1952 | Carson |
| 2,616,112 A | 11/1952 | Smulski |
| 2,643,411 A | 6/1953 | Nesson |

(Continued)

FOREIGN PATENT DOCUMENTS

| | | |
|---|---|---|
| AR | 206463 | 7/1976 |
| AU | 409933 | 2/1971 |

(Continued)

OTHER PUBLICATIONS

Machine translation of description portion of German publication 10043427, published Mar. 2002.*

(Continued)

*Primary Examiner* — Gary Graham
(74) *Attorney, Agent, or Firm* — Cozen O'Connor

(57) ABSTRACT

A wiper blade with a modular mounting base, having a wiper strip and a primary frame. The primary frame may be provided with a recessed portion having a base portion, a proximal end and a distal end, and may further be provided with a projection disposed on the proximal end, and with receiving holes on the base portion. The primary frame is capable of securing a mounting base having a bottom, a proximal end and a distal end such that one or more locking legs descending from the bottom of the mounting base can engage the receiving holes in the bottom portion of the primary frame, and such that the projection on the proximal portion of the recessed portion engages a guiding channel on the proximal end of the mounting base.

6 Claims, 6 Drawing Sheets

(56) References Cited

U.S. PATENT DOCUMENTS

| | | | |
|---|---|---|---|
| 2,658,223 A | 11/1953 | Enochian |
| 2,799,887 A | 7/1957 | Nemic |
| 2,801,436 A | 8/1957 | Scinta |
| 2,814,820 A | 12/1957 | Elliot et al. |
| 2,890,472 A | 6/1959 | Olson |
| 2,932,843 A | 4/1960 | Zaiger et al. |
| 2,937,393 A | 5/1960 | Brueder |
| 2,946,078 A | 7/1960 | Deibel et al. |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,116,510 A | 1/1964 | Oishei et al. |
| 3,132,367 A | 5/1964 | Wise |
| 3,139,644 A | 7/1964 | Smith |
| 3,147,506 A | 9/1964 | Williams |
| 3,147,507 A | 9/1964 | Glynm |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,405,421 A | 10/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,631 A | 7/1972 | Yamadai et al. |
| 3,685,086 A | 8/1972 | Frohlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,535 A | 3/1975 | Arman |
| 3,872,537 A | 3/1975 | Bianchi |
| 3,879,793 A | 4/1975 | Schlegel |
| 3,879,794 A | 4/1975 | Roberts, Jr. |
| 3,881,213 A | 5/1975 | Tilli |
| 3,881,214 A | 5/1975 | Palu |
| D236,337 S | 8/1975 | Deibel |
| 3,929,222 A | 12/1975 | Smith et al. |
| 3,942,212 A | 3/1976 | Steger et al. |
| 3,969,784 A | 7/1976 | Journee |
| D240,809 S | 8/1976 | Deibel |
| 3,995,347 A | 12/1976 | Kohler |
| 4,007,511 A | 2/1977 | Deibel |
| 4,009,504 A | 3/1977 | Dario |
| 4,028,770 A | 6/1977 | Appel |
| 4,047,480 A | 9/1977 | Vassiliou |
| 4,063,328 A | 12/1977 | Arman |
| D248,375 S | 7/1978 | Bergstein |
| D248,388 S | 7/1978 | Hughes |
| 4,102,003 A | 7/1978 | Hancu |
| 4,120,069 A | 10/1978 | Sharp et al. |
| 4,127,912 A | 12/1978 | Deibel et al. |
| 4,127,916 A | 12/1978 | Van den Berg et al. |
| D253,040 S | 10/1979 | Fournier et al. |
| D253,167 S | 10/1979 | Fournier et al. |
| D257,339 S | 10/1980 | Ellinwood |
| 4,239,104 A | 12/1980 | Roccaforte et al. |
| 4,308,635 A | 1/1982 | Maiocco |
| 4,309,790 A | 1/1982 | Bauer et al. |
| 4,324,019 A * | 4/1982 | Mohnach .................. B60S 1/40 |
| | | 15/250.32 |
| 4,327,458 A | 5/1982 | Maiocco |
| 4,334,001 A * | 6/1982 | Horie .................. G03G 5/0661 |
| | | 430/581 |
| 4,339,839 A | 7/1982 | Knights |
| 4,342,126 A | 8/1982 | Neefeldt |
| 4,343,063 A | 8/1982 | Batt |
| 4,343,064 A | 8/1982 | van den Berg et al. |
| 4,354,293 A | 10/1982 | Le Sausse et al. |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| D282,243 S | 1/1986 | Mason |
| D282,718 S | 2/1986 | Fireman |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| 4,649,591 A * | 3/1987 | Guerard .................. B60S 1/40 |
| | | 15/250.32 |
| 4,670,284 A | 6/1987 | Berkoff |
| 4,670,934 A | 6/1987 | Epple et al. |
| D295,020 S | 4/1988 | Franchi |
| 4,741,071 A | 5/1988 | Bauer et al. |
| D296,317 S | 6/1988 | Mower et al. |
| 4,760,934 A | 8/1988 | Epple et al. |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,795,288 A | 1/1989 | Sakai |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| 4,930,180 A | 6/1990 | Longman |
| D310,193 S | 8/1990 | Charet |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,027,947 A | 7/1991 | Reighart |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| 5,082,078 A | 1/1992 | Umeda et al. |
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |
| D324,667 S | 3/1992 | Williams |
| 5,093,954 A | 3/1992 | Kuzuno |
| D327,013 S | 6/1992 | Reighart |
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |

(56) References Cited

U.S. PATENT DOCUMENTS

| | | |
|---|---|---|
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |
| D336,739 S | 6/1993 | Wu et al. |
| 5,218,735 A | 6/1993 | Maubray |
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,289,608 A | 3/1994 | Kim |
| 5,307,536 A | 5/1994 | Lescher |
| 5,311,636 A | 5/1994 | Lee |
| 5,312,177 A | 5/1994 | Coulter |
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |
| D350,723 S | 9/1994 | Longazel |
| 5,349,716 A | 9/1994 | Millar |
| 5,361,896 A | 11/1994 | Yang |
| D353,354 S | 12/1994 | Oyama |
| 5,372,449 A | 12/1994 | Bauer et al. |
| 5,383,248 A | 1/1995 | Hi |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |
| 5,412,177 A | 5/1995 | Clark |
| 5,435,041 A * | 7/1995 | Ho .................... B60S 1/3801 15/250.201 |
| 5,454,135 A | 10/1995 | Okuya et al. |
| 5,459,900 A | 10/1995 | Mege et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| D367,839 S | 3/1996 | Abbott et al. |
| 5,497,528 A | 3/1996 | Wu |
| 5,509,166 A | 4/1996 | Wagner et al. |
| D370,199 S | 5/1996 | Kim |
| 5,519,913 A | 5/1996 | Schedule |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| 5,568,670 A | 10/1996 | Samples et al. |
| D375,289 S | 11/1996 | Waselewski et al. |
| 5,577,292 A | 11/1996 | Blachetta et al. |
| D376,792 S | 12/1996 | Chodkiewicz |
| 5,593,125 A | 1/1997 | Storz et al. |
| D377,754 S | 2/1997 | Abbott et al. |
| 5,606,766 A | 3/1997 | Lee |
| 5,628,085 A | 5/1997 | Edele et al. |
| D379,613 S | 6/1997 | Chen |
| 5,647,088 A | 7/1997 | Bommer et al. |
| D382,848 S | 8/1997 | Chen |
| 5,661,870 A | 9/1997 | Eustache et al. |
| 5,661,871 A | 9/1997 | Scorsiroli |
| D389,449 S | 1/1998 | Hussaini |
| D390,823 S | 2/1998 | Baranowski et al. |
| D392,612 S | 3/1998 | Jonasson et al. |
| 5,732,437 A | 3/1998 | Jonasson et al. |
| D393,619 S | 4/1998 | Jeffer et al. |
| 5,742,973 A | 4/1998 | Kessler |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| 5,791,010 A | 8/1998 | Brady et al. |
| 5,819,361 A | 10/1998 | Merkel et al. |
| 5,836,110 A | 11/1998 | Buening |
| D402,953 S | 12/1998 | Kim |
| D404,354 S | 1/1999 | Witek et al. |
| D406,094 S | 2/1999 | Lai |
| D406,257 S | 3/1999 | Lee |
| D406,755 S | 3/1999 | Garganese |
| D406,756 S | 3/1999 | Garganese |
| 5,875,672 A | 3/1999 | Fourie et al. |
| 5,885,023 A | 3/1999 | Witek et al. |
| 5,889,334 A | 3/1999 | Hongo |
| 5,899,334 A | 5/1999 | Domerchie et al. |
| D411,161 S | 6/1999 | Wooten |
| D411,504 S | 6/1999 | Hsu |
| 5,907,885 A | 6/1999 | Tilli et al. |
| 5,911,358 A | 6/1999 | Kenner et al. |
| 5,920,947 A | 7/1999 | Varner |
| D413,261 S | 8/1999 | Yerich |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,026,537 A | 2/2000 | Hojnacki |
| 6,055,697 A | 5/2000 | Wollenschlaeger |
| 6,063,216 A | 5/2000 | Damm et al. |
| D427,134 S | 6/2000 | Lee |
| 6,070,723 A | 6/2000 | Lewis |
| 6,088,872 A | 7/2000 | Schmid et al. |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| 6,216,311 B1 | 4/2001 | Van Damme et al. |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| 6,247,590 B1 | 6/2001 | Baker |
| D444,760 S | 7/2001 | Houssat et al. |
| D445,754 S | 7/2001 | Benoit |
| 6,266,843 B1 | 7/2001 | Doman et al. |
| 6,279,191 B1 | 8/2001 | Kotlarski et al. |
| 6,279,746 B1 | 8/2001 | Hussaini et al. |
| D448,295 S | 9/2001 | Mozes |
| 6,286,176 B1 | 9/2001 | Westermann et al. |
| 6,292,974 B1 | 9/2001 | Merket et al. |
| 6,295,690 B1 | 10/2001 | Merkel et al. |
| 6,301,742 B1 | 10/2001 | Kota |
| 6,305,066 B1 | 10/2001 | De Paolo et al. |
| 6,308,373 B1 | 10/2001 | Merkel et al. |
| 6,327,738 B1 | 12/2001 | Lewis |
| 6,332,236 B1 | 12/2001 | Ku |
| 6,336,243 B1 | 1/2002 | Charng |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| 6,415,473 B1 | 7/2002 | Rapp |

(56) References Cited

U.S. PATENT DOCUMENTS

| | | |
|---|---|---|
| D462,044 S | 8/2002 | Gfatter et al. |
| 6,427,282 B1 | 8/2002 | Kotlarski |
| 6,434,780 B1 | 8/2002 | Kotlarski |
| D462,262 S | 9/2002 | Leja |
| 6,449,797 B1 | 9/2002 | De Block |
| 6,453,505 B1 | 9/2002 | Terai |
| D464,012 S | 10/2002 | Hussaini et al. |
| D464,600 S | 10/2002 | Chen |
| 6,499,181 B1 | 12/2002 | Kotlarski |
| D469,731 S | 2/2003 | Geer |
| 6,513,186 B1 | 2/2003 | Zimmer |
| 6,516,491 B2 | 2/2003 | Merkel et al. |
| 6,523,218 B1 | 2/2003 | Kotlarski |
| D471,505 S | 3/2003 | Wang |
| 6,530,111 B1 | 3/2003 | Kotlarski |
| D472,510 S | 4/2003 | Lin |
| D473,180 S | 4/2003 | Sun |
| D473,507 S | 4/2003 | Huang |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| 6,766,906 B2 | 6/2004 | Charng |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B2 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,962 S | 12/2004 | Lee et al. |
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B1 | 3/2005 | Siklosi |
| 6,874,195 B2 | 4/2005 | Kotlarski |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,511 B2 | 12/2005 | Poton |
| 6,978,512 B2 | 12/2005 | Dietrich et al. |
| 7,007,339 B2 | 3/2006 | Weilet et al. |
| 7,024,722 B2 | 4/2006 | Neubauer et al. |
| 7,036,181 B2 | 5/2006 | Zimmer |
| D522,380 S | 6/2006 | Dibnah et al. |
| 7,055,207 B2 | 6/2006 | Coughlin |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 | 12/2006 | Huang |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,207,082 B2 | 4/2007 | Lee |
| 7,228,588 B2 | 6/2007 | Kraemer et al. |
| D546,669 S | 7/2007 | Sheppard et al. |
| D547,713 S | 7/2007 | Goeller |
| D549,151 S | 8/2007 | Janssis et al. |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| D556,118 S | 11/2007 | Claes |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,316,087 B1 | 1/2008 | Smith |
| D564,434 S | 3/2008 | Claes |
| D564,955 S | 3/2008 | Claes |
| 7,337,900 B2 | 3/2008 | Reiber et al. |
| 7,341,396 B2 | 3/2008 | Huang |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D575,146 S | 8/2008 | Lee |
| D577,324 S | 9/2008 | McCray |
| 7,434,291 B2 | 10/2008 | Chiang |
| D579,849 S | 11/2008 | Garrastacho et al. |
| 7,451,520 B2 | 11/2008 | Weiler et al. |
| D582,765 S | 12/2008 | Gustafson et al. |
| 7,461,429 B2 | 12/2008 | Huang |
| 7,464,433 B2 | 12/2008 | Thomar et al. |
| D584,160 S | 1/2009 | Zimmermann |
| 7,472,451 B2 | 1/2009 | Hara et al. |
| D586,663 S | 2/2009 | Tidqvist |
| D586,716 S | 2/2009 | Radfar |
| D586,717 S | 2/2009 | Depondt |
| D587,186 S | 2/2009 | Herinckx et al. |
| 7,484,264 B2 | 2/2009 | Kraemer et al. |
| 7,493,672 B2 | 2/2009 | Op't Roodt |
| D588,933 S | 3/2009 | Bonzagni et al. |
| 7,503,095 B2 | 3/2009 | Lin et al. |
| 7,506,401 B2 | 3/2009 | Park |
| 7,509,704 B2 | 3/2009 | Bauer et al. |

(56) References Cited

U.S. PATENT DOCUMENTS

| | | |
|---|---|---|
| 7,523,519 B2 | 4/2009 | Egner-Walter et al. |
| 7,523,520 B2 | 4/2009 | Breesch |
| 7,523,522 B2 | 4/2009 | Herring et al. |
| D592,121 S | 5/2009 | Bratec et al. |
| 7,526,832 B2 | 5/2009 | Matsumoto et al. |
| 7,527,151 B2 | 5/2009 | Park |
| D593,480 S | 6/2009 | Kim |
| D593,923 S | 6/2009 | Bratec et al. |
| 7,543,353 B2 | 6/2009 | Ko |
| 7,552,502 B2 | 6/2009 | Kagawa et al. |
| D596,102 S | 7/2009 | Kim |
| 7,559,110 B1 | 7/2009 | Kotlarski et al. |
| D601,077 S | 9/2009 | Kim |
| 7,581,280 B2 | 9/2009 | Op't Roodt et al. |
| 7,581,887 B2 | 9/2009 | Zimmer |
| 7,584,520 B2 | 9/2009 | Hussaini et al. |
| 7,596,479 B2 | 9/2009 | Weiler et al. |
| 7,603,741 B2 | 10/2009 | Verelst et al. |
| 7,603,742 B2 | 10/2009 | Nakano et al. |
| 7,607,194 B2 | 10/2009 | Weber et al. |
| 7,614,499 B2 | 11/2009 | Mueller |
| 7,621,016 B2 | 11/2009 | Verelst et al. |
| 7,628,560 B2 | 12/2009 | Westermann et al. |
| 7,634,833 B2 | 12/2009 | Boland et al. |
| 7,636,980 B2 | 12/2009 | Nakano |
| D608,717 S | 1/2010 | Aglassinger |
| D610,518 S | 2/2010 | Aglassinger |
| D610,519 S | 2/2010 | Aglassinger |
| D610,520 S | 2/2010 | Aglassinger |
| D611,809 S | 3/2010 | Borgerson et al. |
| 7,669,276 B2 | 3/2010 | Verelst et al. |
| 7,687,565 B2 | 3/2010 | Geilenkirchen |
| 7,690,073 B2 | 4/2010 | Marmoy et al. |
| 7,690,509 B2 | 4/2010 | Herring et al. |
| 7,699,169 B2 | 4/2010 | Lewis |
| D615,918 S | 5/2010 | Kim |
| 7,707,680 B2 | 5/2010 | Hawighorst et al. |
| 7,716,780 B2 | 5/2010 | Scholl et al. |
| 7,718,509 B2 | 5/2010 | Endo et al. |
| 7,743,457 B2 | 6/2010 | Metz |
| 7,748,076 B2 | 7/2010 | Weiler et al. |
| D621,322 S | 8/2010 | Lee et al. |
| 7,780,214 B2 | 8/2010 | Kraus et al. |
| 7,788,761 B2 | 9/2010 | Weiler et al. |
| 7,793,382 B2 | 9/2010 | Van De Rovaart |
| 7,797,787 B2 | 9/2010 | Wilms et al. |
| 7,805,800 B2 | 10/2010 | Wilms et al. |
| 7,810,206 B2 | 10/2010 | Weiler et al. |
| 7,814,611 B2 | 10/2010 | Heinrich et al. |
| D627,288 S | 11/2010 | Lee |
| 7,823,953 B2 | 11/2010 | Haas |
| 7,832,045 B2 | 11/2010 | Weiler et al. |
| 7,832,047 B2 | 11/2010 | Herinckx et al. |
| 7,836,542 B2 | 11/2010 | Dietrich et al. |
| 7,849,553 B2 | 12/2010 | Weiler et al. |
| D632,557 S | 2/2011 | Clamagirand et al. |
| 7,886,401 B2 | 2/2011 | Weber et al. |
| 7,891,043 B2 | 2/2011 | Kraus et al. |
| 7,891,044 B2 | 2/2011 | Fink et al. |
| 7,895,702 B2 | 3/2011 | Tisch et al. |
| 7,895,703 B2 | 3/2011 | Ina et al. |
| 7,898,141 B2 | 3/2011 | Hurst et al. |
| 7,899,596 B2 | 3/2011 | Zimmer |
| 7,908,703 B2 | 3/2011 | Van Bealen |
| 7,908,704 B2 | 3/2011 | Kraemer |
| 7,921,503 B1 | 4/2011 | Chiang |
| 7,921,504 B1 | 4/2011 | Chiang |
| 7,921,506 B2 | 4/2011 | Chiang |
| 7,926,659 B2 | 4/2011 | Kim |
| 7,930,796 B2 | 4/2011 | Weiler et al. |
| D637,132 S | 5/2011 | Kim |
| 7,937,798 B2 | 5/2011 | Fink et al. |
| 7,941,891 B2 | 5/2011 | Breesch |
| 7,941,892 B2 | 5/2011 | Kraus et al. |
| 7,945,985 B2 | 5/2011 | Stubner |
| 7,945,987 B2 | 5/2011 | Verelst et al. |
| 7,950,717 B2 | 5/2011 | Metz |
| 7,962,787 B2 | 6/2011 | Camilleri et al. |
| 7,966,689 B2 | 6/2011 | Rovaart et al. |
| 7,971,312 B2 | 7/2011 | Crabee et al. |
| 7,975,849 B2 | 7/2011 | Kim |
| 7,979,950 B2 | 7/2011 | Boland |
| 7,989,955 B2 | 8/2011 | Yagi |
| 7,989,995 B2 | 8/2011 | Reith et al. |
| 7,992,248 B2 | 8/2011 | Koppers et al. |
| 7,996,953 B2 | 8/2011 | Braun et al. |
| D644,925 S | 9/2011 | Jaworski |
| 8,020,246 B2 | 9/2011 | Bauer et al. |
| 8,020,248 B2 | 9/2011 | Hasegawa |
| 8,020,249 B2 | 9/2011 | Masuda et al. |
| 8,024,836 B2 | 9/2011 | Moll et al. |
| 8,026,645 B2 | 9/2011 | Stubner et al. |
| D647,451 S | 10/2011 | Lin |
| 8,042,690 B2 | 10/2011 | Lewis |
| D647,795 S | 11/2011 | Eaton et al. |
| 8,051,526 B2 | 11/2011 | Summerville et al. |
| 8,060,976 B2 | 11/2011 | Mayer et al. |
| 8,069,528 B2 | 12/2011 | Verelst et al. |
| 8,076,807 B2 | 12/2011 | Bohn et al. |
| D651,509 S | 1/2012 | Methe et al. |
| 8,096,013 B2 | 1/2012 | Eschenbrenner et al. |
| 8,099,823 B2 | 1/2012 | Kraemer et al. |
| 8,104,134 B2 | 1/2012 | Ritt |
| 8,104,136 B2 | 1/2012 | Carangelo |
| 8,117,710 B2 | 2/2012 | Kraus et al. |
| 8,125,111 B2 | 2/2012 | Bohn et al. |
| 8,141,198 B2 | 3/2012 | Wilms et al. |
| 8,148,467 B2 | 4/2012 | Pieters et al. |
| 8,151,656 B2 | 4/2012 | Nicgorski, II |
| 8,156,604 B2 | 4/2012 | Kraus et al. |
| 8,156,605 B2 | 4/2012 | Dietrich et al. |
| 8,165,796 B2 | 4/2012 | Hoetzer |
| D658,494 S | 5/2012 | Raimer et al. |
| 8,166,605 B2 | 5/2012 | Lee |
| 8,169,791 B2 | 5/2012 | Wolf et al. |
| 8,180,518 B2 | 5/2012 | Petricoin, Jr. |
| 8,181,305 B2 | 5/2012 | Boos |
| 8,181,306 B2 | 5/2012 | Merkel |
| 8,181,307 B2 | 5/2012 | Wilms et al. |
| 8,181,308 B2 | 5/2012 | Kwon et al. |
| 8,186,002 B2 | 5/2012 | Kinnaert et al. |
| 8,191,200 B2 | 6/2012 | Kim |
| 8,191,201 B2 | 6/2012 | De Block et al. |
| 8,196,253 B2 | 6/2012 | Barlas |
| 8,196,254 B2 | 6/2012 | Mahfoudh et al. |
| 8,196,255 B2 | 6/2012 | De Block et al. |
| 8,205,290 B2 | 6/2012 | Weiler et al. |
| 8,205,291 B2 | 6/2012 | Eschenbrenner et al. |
| 8,214,965 B2 | 7/2012 | Volz et al. |
| 8,230,547 B2 | 7/2012 | Wilms et al. |
| 8,234,746 B2 | 8/2012 | Lutterodt et al. |
| 8,245,350 B2 | 8/2012 | Van De Rostyne et al. |
| 8,256,851 B2 | 9/2012 | Pelosse |
| 8,261,403 B2 | 9/2012 | Ehde |
| 8,261,405 B2 | 9/2012 | Kim et al. |
| 8,261,628 B2 | 9/2012 | Moecklin et al. |
| 8,266,759 B2 | 9/2012 | Braun et al. |
| 8,272,096 B2 | 9/2012 | Wilms et al. |
| 8,272,360 B2 | 9/2012 | Hartmann et al. |
| 8,286,533 B2 | 10/2012 | Hurst et al. |
| 8,294,327 B2 | 10/2012 | Chaumet et al. |
| D671,827 S | 12/2012 | Raimer et al. |
| 8,322,456 B2 | 12/2012 | Pozgay et al. |
| 8,327,500 B2 | 12/2012 | De Block et al. |
| 8,328,011 B2 | 12/2012 | Skurdalsvold et al. |
| 8,333,093 B2 | 12/2012 | Kleckner et al. |
| D674,733 S | 1/2013 | Lee |
| 8,341,799 B2 | 1/2013 | Koppen et al. |
| 8,347,449 B2 | 1/2013 | Genet et al. |
| 8,356,520 B2 | 1/2013 | Hurst et al. |
| 8,359,701 B2 | 1/2013 | De Block et al. |
| 8,361,595 B2 | 1/2013 | Van De Rostyne et al. |
| 8,370,986 B2 | 2/2013 | Wilms et al. |
| 8,370,987 B2 | 2/2013 | Ritt |

(56) References Cited

U.S. PATENT DOCUMENTS

| | | |
|---|---|---|
| 8,370,988 B2 | 2/2013 | Kraus et al. |
| 8,373,322 B2 | 2/2013 | Wegner et al. |
| 8,375,503 B2 | 2/2013 | Aznag |
| 8,381,348 B2 | 2/2013 | Egner-Walter et al. |
| 8,381,349 B2 | 2/2013 | Ku |
| 8,381,350 B2 | 2/2013 | Op't Roodt et al. |
| 8,397,340 B2 | 3/2013 | Weiler et al. |
| 8,397,341 B2 | 3/2013 | Ehde |
| D679,234 S | 4/2013 | Depondt |
| D679,235 S | 4/2013 | Depondt |
| D680,051 S | 4/2013 | Tolentino et al. |
| 8,410,651 B2 | 4/2013 | Lauk |
| 8,413,291 B2 | 4/2013 | Wu |
| 8,413,292 B2 | 4/2013 | Yang et al. |
| 8,418,644 B2 | 4/2013 | Fiedor et al. |
| 8,424,149 B2 | 4/2013 | Coemans et al. |
| 8,429,786 B2 | 4/2013 | Van Baelen et al. |
| 8,434,621 B2 | 5/2013 | Hun et al. |
| 8,448,289 B2 | 5/2013 | Reith et al. |
| 8,448,290 B2 | 5/2013 | Op't Roodt et al. |
| D684,862 S | 6/2013 | DiFranza |
| 8,453,292 B2 | 6/2013 | Jeon |
| D685,260 S | 7/2013 | Thielemier |
| D686,912 S | 7/2013 | Ehde et al. |
| 8,474,088 B2 | 7/2013 | Wu |
| 8,484,794 B2 | 7/2013 | Westermann et al. |
| 8,490,239 B2 | 7/2013 | Ehde |
| 8,495,787 B2 | 7/2013 | Garrastacho et al. |
| 8,499,408 B2 | 8/2013 | Boland |
| 8,505,151 B2 | 8/2013 | Depondt et al. |
| 8,505,152 B2 | 8/2013 | Boland |
| 8,505,724 B2 | 8/2013 | Bult et al. |
| 8,510,895 B2 | 8/2013 | Beelen et al. |
| 8,510,897 B2 | 8/2013 | Ku |
| 8,510,898 B2 | 8/2013 | Ku |
| 8,522,393 B2 | 9/2013 | Boland |
| 8,539,634 B2 | 9/2013 | Wilms et al. |
| 8,544,136 B2 | 10/2013 | Kraemer et al. |
| 8,544,137 B2 | 10/2013 | Thienard |
| 8,549,695 B2 | 10/2013 | Reith et al. |
| 8,552,113 B2 | 10/2013 | Pieters et al. |
| 8,555,455 B2 | 10/2013 | Boland |
| 8,555,456 B2 | 10/2013 | Ehde |
| 8,561,717 B2 | 10/2013 | Pozgay et al. |
| D692,750 S | 11/2013 | Ehde et al. |
| D692,818 S | 11/2013 | Tolentino et al. |
| D692,819 S | 11/2013 | Tolentino et al. |
| D693,213 S | 11/2013 | Lee et al. |
| 8,574,791 B2 | 11/2013 | Maus et al. |
| 8,575,078 B2 | 11/2013 | Duval et al. |
| 8,581,530 B2 | 11/2013 | Tisch |
| 8,582,809 B2 | 11/2013 | Halimeh et al. |
| 8,584,303 B2 | 11/2013 | Wolfgarten et al. |
| 8,590,097 B2 | 11/2013 | Bohn et al. |
| D695,632 S | 12/2013 | Akana et al. |
| 8,595,888 B2 | 12/2013 | Op't Roodt et al. |
| 8,595,889 B2 | 12/2013 | Op't Roodt et al. |
| 8,613,357 B2 | 12/2013 | Putnam |
| D697,790 S | 1/2014 | Iwegbu |
| 8,646,181 B2 | 2/2014 | Baumann et al. |
| D700,524 S | 3/2014 | Ferriter |
| 8,661,602 B2 | 3/2014 | Op't Roodt et al. |
| D702,619 S | 4/2014 | Kim |
| 8,686,612 B2 | 4/2014 | Roos et al. |
| 8,707,506 B1 | 4/2014 | Wu |
| D704,127 S | 5/2014 | Depondt |
| D704,128 S | 5/2014 | Depondt |
| D704,129 S | 5/2014 | Depondt |
| D704,619 S | 5/2014 | Kim |
| D704,620 S | 5/2014 | Kim |
| 8,717,011 B2 | 5/2014 | Henning |
| 8,719,994 B2 | 5/2014 | Thienard et al. |
| 8,720,033 B2 | 5/2014 | Koppen et al. |
| 8,728,367 B2 | 5/2014 | Lay et al. |
| D706,200 S | 6/2014 | Tolentino et al. |
| D706,201 S | 6/2014 | Depondt |
| D706,202 S | 6/2014 | Depondt |
| 8,745,812 B2 | 6/2014 | Kruse et al. |
| 8,745,813 B2 | 6/2014 | Ishida et al. |
| 8,749,186 B2 | 6/2014 | Stubner et al. |
| 8,759,449 B2 | 6/2014 | Pieters et al. |
| D708,890 S | 7/2014 | Kim et al. |
| D709,362 S | 7/2014 | Kim |
| 8,769,762 B2 | 7/2014 | Op't Roodt et al. |
| 8,770,063 B2 | 7/2014 | Bhatti |
| 8,782,847 B2 | 7/2014 | Depondt |
| D711,217 S | 8/2014 | Jacobs et al. |
| 8,800,097 B2 | 8/2014 | Wegner et al. |
| 8,800,099 B2 | 8/2014 | Boland |
| 8,806,700 B2 | 8/2014 | Tolentino et al. |
| 8,813,608 B2 | 8/2014 | Hurst et al. |
| 8,823,228 B2 | 9/2014 | Mili et al. |
| 8,839,483 B2 | 9/2014 | Roodt et al. |
| D714,635 S | 10/2014 | Demar et al. |
| D715,142 S | 10/2014 | Allen et al. |
| 8,850,653 B2 | 10/2014 | Depondt |
| 8,854,455 B2 | 10/2014 | Haug |
| 8,857,595 B2 | 10/2014 | Mili et al. |
| 8,863,370 B2 | 10/2014 | Weiler et al. |
| 8,871,994 B2 | 10/2014 | Wei et al. |
| D717,225 S | 11/2014 | Kuo |
| 8,881,338 B2 | 11/2014 | Thielen et al. |
| 8,893,348 B2 | 11/2014 | Vankerkhove et al. |
| 8,909,421 B2 | 12/2014 | Zimmer |
| 8,913,132 B2 | 12/2014 | Seger et al. |
| 8,913,133 B2 | 12/2014 | Huelsen et al. |
| 8,917,323 B2 | 12/2014 | Seger et al. |
| 8,931,133 B2 | 1/2015 | Coart et al. |
| 8,935,056 B2 | 1/2015 | Zimmer |
| 8,938,847 B2 | 1/2015 | Avasiloaie et al. |
| 8,950,034 B2 | 2/2015 | Wilms |
| 8,950,035 B2 | 2/2015 | Benner et al. |
| 8,957,619 B2 | 2/2015 | Karcher |
| 8,963,464 B2 | 2/2015 | Braun et al. |
| D725,025 S | 3/2015 | Poton |
| 8,973,207 B2 | 3/2015 | Depondt |
| 8,973,209 B2 | 3/2015 | Depondt |
| 8,979,066 B2 | 3/2015 | Pfetzer et al. |
| 8,984,707 B2 | 3/2015 | Boland |
| 8,985,241 B2 | 3/2015 | Pozgay et al. |
| 8,997,304 B2 | 4/2015 | Oslizlo et al. |
| 9,003,594 B2 | 4/2015 | Guidez |
| 9,003,596 B2 | 4/2015 | Avasiloaie et al. |
| 9,008,905 B2 | 4/2015 | Prskawetz et al. |
| 9,015,896 B2 | 4/2015 | De Block |
| 9,018,877 B2 | 4/2015 | Braun et al. |
| 9,021,651 B2 | 5/2015 | Wolfgarten |
| 9,021,652 B2 | 5/2015 | Coemans et al. |
| 9,045,111 B2 | 6/2015 | Zimmer |
| 9,045,113 B2 | 6/2015 | Aznag et al. |
| 9,050,946 B2 | 6/2015 | Zimmer et al. |
| 9,056,595 B2 | 6/2015 | Wegner et al. |
| 9,071,089 B2 | 6/2015 | Kastinger et al. |
| 9,073,519 B2 | 7/2015 | Depondt |
| 9,079,567 B2 | 7/2015 | Wegner et al. |
| 9,096,196 B2 | 8/2015 | Criel et al. |
| 9,108,595 B2 | 8/2015 | Tolentino et al. |
| 9,114,754 B2 | 8/2015 | Ehlgen et al. |
| 9,114,783 B2 | 8/2015 | Depondt |
| 9,120,463 B2 | 9/2015 | Kim et al. |
| 9,120,464 B2 | 9/2015 | Pack et al. |
| 9,151,372 B2 | 10/2015 | Keller |
| 9,174,609 B2 | 11/2015 | Tolentino et al. |
| 9,174,611 B2 | 11/2015 | Tolentino et al. |
| 9,180,839 B2 | 11/2015 | Oslizlo et al. |
| D744,331 S | 12/2015 | Vos et al. |
| 9,211,867 B2 | 12/2015 | Beelen et al. |
| 9,211,868 B2 | 12/2015 | Bousset et al. |
| 9,225,274 B2 | 12/2015 | Lingenfelser et al. |
| D746,700 S | 1/2016 | Boehnen et al. |
| 9,227,596 B2 | 1/2016 | Van De Rovaart et al. |
| 9,227,598 B2 | 1/2016 | Smets et al. |
| 9,233,664 B2 | 1/2016 | Weidlich |
| 9,254,820 B2 | 2/2016 | Geubel et al. |

(56) References Cited

U.S. PATENT DOCUMENTS

| | | | |
|---|---|---|---|
| 9,260,085 B2 | 2/2016 | Bex et al. | |
| 9,266,504 B2 | 2/2016 | De Block | |
| 9,272,676 B2 | 3/2016 | Heger et al. | |
| 9,505,380 B2 | 11/2016 | Tolentino et al. | |
| D777,079 S | 1/2017 | Tolentino et al. | |
| D784,804 S | 4/2017 | Peers et al. | |
| D787,308 S | 5/2017 | Kawashima et al. | |
| D787,312 S | 5/2017 | Peers et al. | |
| D796,413 S | 9/2017 | Di Iulio | |
| 2001/0013236 A1 | 8/2001 | Weyerstall et al. | |
| 2002/0043092 A1 | 4/2002 | Jones et al. | |
| 2002/0112306 A1 | 8/2002 | Komerska | |
| 2002/0174505 A1 | 11/2002 | Kim | |
| 2002/0192017 A1 | 12/2002 | Rosenstein et al. | |
| 2003/0014828 A1 | 1/2003 | Edner-Walter et al. | |
| 2003/0028990 A1 | 2/2003 | Zimmer | |
| 2003/0033683 A1 | 2/2003 | Kotlarski | |
| 2003/0074763 A1 | 4/2003 | Egner-Walter et al. | |
| 2003/0159229 A1 | 8/2003 | Weiler et al. | |
| 2003/0209049 A1 | 11/2003 | Jones et al. | |
| 2003/0221276 A1 | 12/2003 | Siklosi | |
| 2003/0229961 A1 | 12/2003 | Barnett | |
| 2004/0010882 A1 | 1/2004 | Breesch | |
| 2004/0025280 A1 | 2/2004 | Krickau et al. | |
| 2004/0025281 A1 | 2/2004 | Baseotto et al. | |
| 2004/0052577 A1 | 3/2004 | Lee et al. | |
| 2004/0098821 A1 | 5/2004 | Kraemer et al. | |
| 2004/0159994 A1 | 8/2004 | Lenzen et al. | |
| 2004/0211021 A1 | 10/2004 | Weber et al. | |
| 2004/0244137 A1 | 12/2004 | Poton | |
| 2004/0250369 A1 | 12/2004 | Matsumoto et al. | |
| 2005/0005387 A1 | 1/2005 | Kinoshita et al. | |
| 2005/0011033 A1 | 1/2005 | Thomar et al. | |
| 2005/0039292 A1 | 2/2005 | Boland | |
| 2005/0166349 A1 | 8/2005 | Nakano et al. | |
| 2005/0177970 A1 | 8/2005 | Scholl et al. | |
| 2005/0252812 A1 | 11/2005 | Lewis | |
| 2006/0010636 A1 | 1/2006 | Vacher | |
| 2006/0026786 A1 | 2/2006 | Ku | |
| 2006/0112511 A1 | 6/2006 | Op't Roodt et al. | |
| 2006/0117515 A1 | 6/2006 | Fink et al. | |
| 2006/0130263 A1 | 6/2006 | Coughlin | |
| 2006/0156529 A1 | 7/2006 | Thomar et al. | |
| 2006/0179597 A1 | 8/2006 | Hoshino et al. | |
| 2006/0218740 A1 | 10/2006 | Coughlin | |
| 2006/0230571 A1 | 10/2006 | Son | |
| 2006/0248675 A1 | 11/2006 | Vacher et al. | |
| 2006/0282972 A1 | 12/2006 | Huang | |
| 2007/0017056 A1 | 1/2007 | Cooke et al. | |
| 2007/0067939 A1 | 3/2007 | Huang | |
| 2007/0067941 A1 | 3/2007 | Huang | |
| 2007/0089257 A1 | 4/2007 | Harita et al. | |
| 2007/0089527 A1 | 4/2007 | Shank et al. | |
| 2007/0186366 A1 | 8/2007 | Alley | |
| 2007/0220698 A1 | 9/2007 | Huang | |
| 2007/0226940 A1 | 10/2007 | Thienard | |
| 2007/0226941 A1 | 10/2007 | Kraemer et al. | |
| 2007/0234501 A1 | 10/2007 | Ho et al. | |
| 2007/0266517 A1 | 11/2007 | Kim et al. | |
| 2008/0052865 A1 | 3/2008 | Chiang | |
| 2008/0083082 A1 | 4/2008 | Rovaart et al. | |
| 2008/0086830 A1 | 4/2008 | Kim | |
| 2008/0092320 A1 | 4/2008 | Cempura et al. | |
| 2008/0098554 A1 | 5/2008 | Cho | |
| 2008/0098559 A1 | 5/2008 | Machida et al. | |
| 2008/0115308 A1 | 5/2008 | Lee | |
| 2008/0148509 A1 | 6/2008 | Bacarella et al. | |
| 2008/0196192 A1 | 8/2008 | Yao | |
| 2008/0222830 A1 | 9/2008 | Chiang | |
| 2008/0222831 A1* | 9/2008 | Thienard | B60S 1/3858 15/250.32 |
| 2008/0222832 A1 | 9/2008 | Huang | |
| 2008/0263805 A1 | 10/2008 | Sebring | |
| 2008/0289133 A1 | 11/2008 | Kim | |
| 2009/0007364 A1 | 1/2009 | Jarasson et al. | |
| 2009/0013492 A1 | 1/2009 | Henin | |
| 2009/0056049 A1 | 3/2009 | Jarasson et al. | |
| 2009/0064440 A1 | 3/2009 | Boland | |
| 2009/0126140 A1 | 5/2009 | Heinrich et al. | |
| 2009/0151110 A1 | 6/2009 | Ku | |
| 2009/0158545 A1 | 6/2009 | Grasso et al. | |
| 2009/0158547 A1 | 6/2009 | Kim | |
| 2009/0172910 A1 | 7/2009 | De Block et al. | |
| 2009/0178226 A1 | 7/2009 | Lee et al. | |
| 2009/0199357 A1* | 8/2009 | Thienard | B60S 1/3853 15/250.32 |
| 2010/0000041 A1 | 1/2010 | Boland | |
| 2010/0005608 A1 | 1/2010 | Chien | |
| 2010/0005609 A1 | 1/2010 | Kim | |
| 2010/0024149 A1 | 2/2010 | Erdal | |
| 2010/0024151 A1 | 2/2010 | Ku | |
| 2010/0050360 A1 | 3/2010 | Chiang | |
| 2010/0050361 A1 | 3/2010 | Chang et al. | |
| 2010/0064468 A1 | 3/2010 | Kang | |
| 2010/0083454 A1 | 4/2010 | Op't Roodt et al. | |
| 2010/0186185 A1* | 7/2010 | Grasso | B60S 1/387 15/250.32 |
| 2010/0205763 A1 | 8/2010 | Ku | |
| 2010/0212101 A1 | 8/2010 | Thienard et al. | |
| 2010/0236008 A1 | 9/2010 | Yang et al. | |
| 2010/0236675 A1 | 9/2010 | Schneider | |
| 2010/0242204 A1 | 9/2010 | Chien | |
| 2010/0251502 A1 | 10/2010 | Summerville et al. | |
| 2010/0281645 A1 | 11/2010 | Kim et al. | |
| 2011/0005020 A1 | 1/2011 | Koppen et al. | |
| 2011/0041280 A1 | 2/2011 | Choi et al. | |
| 2011/0047742 A1 | 3/2011 | Kim et al. | |
| 2011/0072607 A1 | 3/2011 | Van Baelen et al. | |
| 2011/0107542 A1* | 5/2011 | Op't Roodt | B60S 1/3851 15/250.31 |
| 2011/0113582 A1 | 5/2011 | Kruse et al. | |
| 2011/0113583 A1 | 5/2011 | Shanmugham et al. | |
| 2011/0162161 A1 | 7/2011 | Amado | |
| 2011/0192511 A1 | 8/2011 | Marrone | |
| 2011/0219563 A1 | 9/2011 | Guastella et al. | |
| 2011/0277264 A1 | 11/2011 | Ehde | |
| 2011/0277266 A1 | 11/2011 | Umeno | |
| 2012/0027206 A1 | 2/2012 | Suzuki et al. | |
| 2012/0030894 A1 | 2/2012 | Garrastacho et al. | |
| 2012/0047673 A1 | 3/2012 | Depondt | |
| 2012/0054976 A1 | 3/2012 | Yang et al. | |
| 2012/0060316 A1 | 3/2012 | Avasiloaie et al. | |
| 2012/0090123 A1 | 4/2012 | Caillot et al. | |
| 2012/0102669 A1 | 5/2012 | Lee et al. | |
| 2012/0144615 A1 | 6/2012 | Song et al. | |
| 2012/0159733 A1 | 6/2012 | Kwon | |
| 2012/0180245 A1 | 7/2012 | Ku | |
| 2012/0180246 A1 | 7/2012 | Ku | |
| 2012/0186035 A1 | 7/2012 | Lee | |
| 2012/0266405 A1 | 10/2012 | Tolentinto et al. | |
| 2012/0279008 A1 | 11/2012 | Depondt | |
| 2012/0311808 A1 | 12/2012 | Yang et al. | |
| 2012/0317740 A1 | 12/2012 | Yang et al. | |
| 2013/0025084 A1 | 1/2013 | Tolentino et al. | |
| 2013/0067674 A1 | 3/2013 | Chiang | |
| 2013/0067675 A1 | 3/2013 | Chien | |
| 2013/0067678 A1 | 3/2013 | Ehde | |
| 2013/0104334 A1 | 5/2013 | Depondt | |
| 2013/0117957 A1 | 5/2013 | Ku | |
| 2013/0125333 A1 | 5/2013 | Tolentino et al. | |
| 2013/0152323 A1 | 6/2013 | Chien | |
| 2013/0152326 A1 | 6/2013 | Oslizlo et al. | |
| 2013/0152330 A1 | 6/2013 | Kim et al. | |
| 2013/0167316 A1 | 7/2013 | Egner-Walter et al. | |
| 2013/0185889 A1 | 7/2013 | Tolentino et al. | |
| 2013/0185890 A1 | 7/2013 | Ku | |
| 2013/0192015 A1 | 8/2013 | Tolentino et al. | |
| 2013/0192016 A1 | 8/2013 | Kim et al. | |
| 2013/0198992 A1 | 8/2013 | Tolentino et al. | |
| 2013/0205532 A1 | 8/2013 | Tolentino et al. | |
| 2013/0212828 A1 | 8/2013 | Coughlin | |
| 2013/0219649 A1 | 8/2013 | Tolentinto et al. | |
| 2013/0227809 A1 | 9/2013 | Tolentinto et al. | |
| 2013/0227810 A1 | 9/2013 | Tolentinto et al. | |

(56) References Cited

U.S. PATENT DOCUMENTS

| | | |
|---|---|---|
| 2013/0247323 A1 | 9/2013 | Geubel et al. |
| 2013/0255026 A1 | 10/2013 | Depondt |
| 2013/0263400 A1 | 10/2013 | Duesterhoeft et al. |
| 2013/0291329 A1 | 11/2013 | Izabel |
| 2013/0298348 A1 | 11/2013 | Caillot et al. |
| 2013/0305475 A1 | 11/2013 | Kim et al. |
| 2013/0305478 A1 | 11/2013 | Kim et al. |
| 2013/0333145 A1 | 12/2013 | Depondt |
| 2013/0333146 A1 | 12/2013 | Depondt |
| 2014/0026348 A1 | 1/2014 | Schaeuble |
| 2014/0026349 A1 | 1/2014 | Schaeuble |
| 2014/0026350 A1 | 1/2014 | Boland |
| 2014/0068886 A1 | 3/2014 | Ku |
| 2014/0115811 A1 | 5/2014 | Kim et al. |
| 2014/0130283 A1 | 5/2014 | Boland et al. |
| 2014/0130287 A1 | 5/2014 | Bex et al. |
| 2014/0150198 A1 | 6/2014 | Kim et al. |
| 2014/0182075 A1 | 7/2014 | Polocoser et al. |
| 2014/0196241 A1 | 7/2014 | Kim et al. |
| 2014/0259504 A1 | 9/2014 | Piotrowski et al. |
| 2014/0259505 A1 | 9/2014 | Fournier et al. |
| 2014/0283325 A1 | 9/2014 | Kawashima et al. |
| 2014/0317875 A1 | 10/2014 | Tolentino et al. |
| 2014/0338144 A1 | 11/2014 | An et al. |
| 2014/0359963 A1 | 12/2014 | An et al. |
| 2014/0373301 A1 | 12/2014 | Kim et al. |
| 2015/0026908 A1 | 1/2015 | Izabel et al. |
| 2015/0047141 A1 | 2/2015 | Houssat et al. |
| 2015/0059116 A1 | 3/2015 | An et al. |
| 2015/0074935 A1 | 3/2015 | An et al. |
| 2015/0089764 A1 | 4/2015 | Wu |
| 2015/0135468 A1 | 5/2015 | Kim |
| 2015/0151718 A1 | 6/2015 | Moll |
| 2015/0158463 A1 | 6/2015 | Yi |
| 2015/0166016 A1 | 6/2015 | Wang |
| 2015/0246659 A1 | 9/2015 | Park |
| 2015/0251636 A1 | 9/2015 | Kim et al. |
| 2015/0251637 A1 | 9/2015 | Tolentino et al. |
| 2015/0258965 A1 | 9/2015 | An |
| 2015/0274130 A1 | 10/2015 | Tolentinto et al. |
| 2015/0274131 A1 | 10/2015 | Tolentinto et al. |
| 2015/0353054 A1 | 12/2015 | Tolentino et al. |
| 2016/0046263 A1 | 2/2016 | Tolentino et al. |
| 2016/0059828 A1 | 3/2016 | Tolentino et al. |
| 2016/0159323 A1 | 6/2016 | Tolentino et al. |
| 2016/0280186 A1 | 9/2016 | Peers et al. |
| 2016/0375867 A1 | 12/2016 | Tolentino et al. |
| 2017/0057464 A1 | 3/2017 | Tolentinto et al. |
| 2017/0072912 A1 | 3/2017 | Tolentino et al. |
| 2017/0113656 A1 | 4/2017 | Tolentino |
| 2017/0334400 A1 | 11/2017 | Kawashima |
| 2017/0334404 A1 | 11/2017 | Kawashima |
| 2017/0334406 A1 | 11/2017 | Kawashima |
| 2017/0334407 A1 | 11/2017 | Kawashima |
| 2017/0334769 A1 | 11/2017 | Luzzato et al. |

FOREIGN PATENT DOCUMENTS

| | | |
|---|---|---|
| AU | 410701 | 2/1971 |
| AU | 649730 | 6/1994 |
| AU | 729371 | 7/2001 |
| AU | 741730 | 12/2001 |
| AU | 762557 | 6/2003 |
| AU | 770944 | 3/2004 |
| AU | 2003257828 | 3/2004 |
| AU | 780818 | 4/2005 |
| AU | 2006100618 | 8/2006 |
| AU | 2006241297 | 6/2007 |
| AU | 2006203445 | 10/2007 |
| AU | 2008100641 | 8/2008 |
| AU | 2009238193 | 10/2009 |
| AU | 2009324257 | 8/2010 |
| AU | 2010294766 A1 | 2/2012 |
| BR | 8304484 | 4/1984 |
| BR | 8604381 | 5/1987 |
| BR | 8707390 | 11/1988 |
| BR | 8903473 | 3/1990 |
| BR | 8907154 | 2/1991 |
| BR | 9005080 | 8/1991 |
| BR | 9105809 | 8/1992 |
| BR | 9200129 | 10/1992 |
| BR | 0006164 | 4/2001 |
| BR | 0007263 | 10/2001 |
| BR | 0106665 | 4/2002 |
| BR | 0106667 | 4/2002 |
| BR | 0306135 | 10/2004 |
| BR | PI0411532 | 8/2006 |
| BR | PI0506158 | 10/2006 |
| BR | PI0007263 | 1/2009 |
| BR | PI0519259 | 1/2009 |
| BR | 0006917 | 8/2009 |
| BR | PI0606903 | 8/2009 |
| BR | PI0901324 | 4/2010 |
| BR | PI0006963 | 9/2010 |
| BR | PI0706762 | 4/2011 |
| BR | PI1000961 | 6/2011 |
| BR | PI0621265 | 12/2011 |
| BR | 102015007588 A2 | 4/2016 |
| CA | 954258 | 9/1974 |
| CA | 966609 | 4/1975 |
| CA | 1038117 | 9/1978 |
| CA | 1075414 | 4/1980 |
| CA | 1124462 | 6/1982 |
| CA | 1184712 | 4/1985 |
| CA | 1257059 | 7/1989 |
| CA | 1263803 | 12/1989 |
| CA | 2027227 | 4/1991 |
| CA | 1289308 | 9/1991 |
| CA | 2037400 | 2/1992 |
| CA | 2093956 | 4/1992 |
| CA | 2079846 | 7/1993 |
| CA | 2118874 | 9/1994 |
| CA | 2156345 | 2/1996 |
| CA | 2174030 | 5/1997 |
| CA | 2260175 | 1/1998 |
| CA | 2220462 | 7/1998 |
| CA | 2243143 | 1/1999 |
| CA | 2344888 | 4/2000 |
| CA | 2414099 | 1/2002 |
| CA | 2472914 | 8/2003 |
| CA | 2487799 | 12/2003 |
| CA | 2515071 | 8/2004 |
| CA | 2242776 | 7/2005 |
| CA | 2553977 | 9/2005 |
| CA | 2554048 A1 | 9/2005 |
| CA | 2514372 | 1/2006 |
| CA | 2574330 | 2/2006 |
| CA | 2523315 | 4/2006 |
| CA | 2541641 | 4/2006 |
| CA | 2522729 | 6/2006 |
| CA | 2598104 | 9/2006 |
| CA | 2550409 | 11/2006 |
| CA | 2568561 | 5/2007 |
| CA | 2569175 | 5/2007 |
| CA | 2569176 | 5/2007 |
| CA | 2569977 | 6/2007 |
| CA | 2560155 | 9/2007 |
| CA | 2645821 | 10/2007 |
| CA | 2649474 | 11/2007 |
| CA | 2649760 | 11/2007 |
| CA | 2651069 | 11/2007 |
| CA | 2590443 | 4/2008 |
| CA | 2631513 | 5/2008 |
| CA | 2574242 | 7/2008 |
| CA | 2617013 | 11/2008 |
| CA | 2628517 | 4/2009 |
| CA | 2671767 | 1/2010 |
| CA | 2500891 | 5/2011 |
| CA | 2789431 | 8/2011 |
| CA | 2809243 | 3/2012 |
| CA | 2809292 | 3/2012 |
| CA | 2809947 | 3/2012 |
| CA | 2831801 A1 | 10/2012 |
| CA | 2835703 | 11/2012 |

(56) References Cited

FOREIGN PATENT DOCUMENTS

| | | |
|---|---|---|
| CA | 2843527 | 1/2013 |
| CA | 2843637 | 2/2013 |
| CA | 2843644 | 2/2013 |
| CA | 2797693 | 5/2013 |
| CA | 147027 S | 6/2013 |
| CA | 147028 S | 6/2013 |
| CA | 2799267 | 6/2013 |
| CA | 2740384 | 7/2013 |
| CA | 2865292 A1 | 8/2013 |
| CA | 2906863 A1 | 9/2014 |
| CA | 2014002241 A1 | 5/2015 |
| CA | 2898928 A1 | 1/2017 |
| CA | 2865295 C | 3/2017 |
| CL | 2014002239 A1 | 5/2015 |
| CL | 2015002693 A1 | 4/2016 |
| CN | 101983148 | 3/2011 |
| CN | 202593459 | 12/2012 |
| CN | 102963337 | 3/2013 |
| CN | 102991462 | 3/2013 |
| CN | 102991466 | 3/2013 |
| CN | 103101514 | 5/2013 |
| CN | 103101516 | 5/2013 |
| CN | 103108782 | 5/2013 |
| CN | 103183008 | 7/2013 |
| CN | 103183009 | 7/2013 |
| CN | 103223923 | 7/2013 |
| CN | 103228498 | 7/2013 |
| CO | 7141449 A2 | 12/2014 |
| CO | 7141460 A2 | 12/2014 |
| DE | 2309063 | 8/1974 |
| DE | 2311293 | 9/1974 |
| DE | 2353368 | 5/1975 |
| DE | 3222864 | 12/1983 |
| DE | 3919050 A1 | 12/1990 |
| DE | 4439275 A1 | 5/1995 |
| DE | 19650929 | 6/1998 |
| DE | 19734843 | 2/1999 |
| DE | 19745460 | 4/1999 |
| DE | 19814609 | 10/1999 |
| DE | 10043427 A1 * | 3/2001 |
| DE | 10054287 | 5/2002 |
| DE | 10228494 A1 | 1/2004 |
| DE | 10230457 A1 | 1/2004 |
| DE | 10320930 | 11/2004 |
| DE | 10343571 A1 | 4/2005 |
| DE | 102004019157 | 11/2005 |
| DE | 102004061088 | 6/2006 |
| DE | 102005019389 | 11/2006 |
| DE | 4224866 B4 | 1/2007 |
| DE | 102005062462 A1 | 6/2007 |
| DE | 102006057024 | 6/2008 |
| DE | 102007030169 | 1/2009 |
| DE | 102007051549 | 4/2009 |
| DE | 102008042516 | 5/2009 |
| DE | 102008001045 | 10/2009 |
| DE | 102008021457 | 11/2009 |
| DE | 102008002447 | 12/2009 |
| DE | 102008049269 | 4/2010 |
| DE | 102008049270 | 4/2010 |
| DE | 102009000483 | 4/2010 |
| DE | 102009001025 | 8/2010 |
| DE | 102010012983 | 2/2011 |
| DE | 102009029469 | 3/2011 |
| DE | 102009029470 | 3/2011 |
| DE | 102009048212 | 4/2011 |
| DE | 102010016348 | 4/2011 |
| DE | 102010041152 A1 | 5/2011 |
| DE | 102010003269 | 9/2011 |
| DE | 202011005213 | 9/2011 |
| DE | 202011100429 | 9/2011 |
| DE | 102010003645 | 10/2011 |
| DE | 102010028102 | 10/2011 |
| DE | 102010029107 | 11/2011 |
| DE | 102010030880 | 1/2012 |
| DE | 102010039526 | 2/2012 |
| EP | 0594451 | 4/1994 |
| EP | 0633170 | 1/1995 |
| EP | 0665143 A1 | 8/1995 |
| EP | 0683703 | 11/1995 |
| EP | 0695246 | 2/1996 |
| EP | 0749378 | 12/1996 |
| EP | 0757636 | 2/1997 |
| EP | 0760761 | 3/1997 |
| EP | 0777594 | 6/1997 |
| EP | 0792704 | 9/1997 |
| EP | 0810936 | 12/1997 |
| EP | 0828638 | 3/1998 |
| EP | 0841229 | 5/1998 |
| EP | 0847346 | 6/1998 |
| EP | 0847347 | 6/1998 |
| EP | 0853561 | 7/1998 |
| EP | 0853563 | 7/1998 |
| EP | 0853565 | 7/1998 |
| EP | 0885791 A1 | 12/1998 |
| EP | 0914269 | 5/1999 |
| EP | 0926028 | 6/1999 |
| EP | 0930991 | 7/1999 |
| EP | 0935546 | 8/1999 |
| EP | 0943511 | 9/1999 |
| EP | 1022202 | 7/2000 |
| EP | 1037778 | 9/2000 |
| EP | 0783998 | 10/2000 |
| EP | 1056628 | 12/2000 |
| EP | 1098795 | 5/2001 |
| EP | 1098796 | 5/2001 |
| EP | 1109706 | 6/2001 |
| EP | 1119475 | 8/2001 |
| EP | 1119476 | 8/2001 |
| EP | 1178907 | 2/2002 |
| EP | 1197406 | 4/2002 |
| EP | 1243489 | 9/2002 |
| EP | 1247707 | 10/2002 |
| EP | 1257445 | 11/2002 |
| EP | 1289804 | 3/2003 |
| EP | 1289806 | 3/2003 |
| EP | 1294596 | 3/2003 |
| EP | 1337420 | 8/2003 |
| EP | 1412235 | 4/2004 |
| EP | 1017514 | 6/2004 |
| EP | 1425204 | 6/2004 |
| EP | 1436179 A1 | 7/2004 |
| EP | 1448414 | 8/2004 |
| EP | 1462327 | 9/2004 |
| EP | 1485279 | 12/2004 |
| EP | 1494901 | 1/2005 |
| EP | 1494902 | 1/2005 |
| EP | 1501710 | 2/2005 |
| EP | 1519862 | 4/2005 |
| EP | 1547883 | 6/2005 |
| EP | 1612113 | 1/2006 |
| EP | 1312522 | 4/2006 |
| EP | 1666319 | 6/2006 |
| EP | 1708911 A1 | 10/2006 |
| EP | 1719673 | 11/2006 |
| EP | 1733939 | 12/2006 |
| EP | 1740424 | 1/2007 |
| EP | 1744940 | 1/2007 |
| EP | 1753646 | 2/2007 |
| EP | 1758772 | 3/2007 |
| EP | 1769987 | 4/2007 |
| EP | 1792794 | 6/2007 |
| EP | 1799518 | 6/2007 |
| EP | 1800977 | 6/2007 |
| EP | 1800978 | 6/2007 |
| EP | 1833708 A1 | 9/2007 |
| EP | 1846274 | 10/2007 |
| EP | 1849666 A1 | 10/2007 |
| EP | 1937524 A1 | 7/2008 |
| EP | 2015971 | 1/2009 |
| EP | 2050638 | 4/2009 |
| EP | 2079617 | 7/2009 |
| EP | 2109557 | 10/2009 |
| EP | 2113432 | 11/2009 |
| EP | 2127969 | 12/2009 |

(56) References Cited

FOREIGN PATENT DOCUMENTS

| | | |
|---|---|---|
| EP | 2134576 | 12/2009 |
| EP | 2138363 A1 | 12/2009 |
| EP | 2143603 | 1/2010 |
| EP | 2146877 | 1/2010 |
| EP | 2177406 A2 * | 4/2010 |
| EP | 2230140 | 9/2010 |
| EP | 2236364 A1 | 10/2010 |
| EP | 2236366 | 10/2010 |
| EP | 2253520 | 11/2010 |
| EP | 2258592 | 12/2010 |
| EP | 1559623 | 1/2011 |
| EP | 2300283 A1 | 3/2011 |
| EP | 2321160 | 5/2011 |
| EP | 2338747 | 6/2011 |
| EP | 2426017 | 3/2012 |
| EP | 002088146-0001 A1 | 8/2012 |
| EP | 002088146-0002 A1 | 8/2012 |
| EP | 2532558 A2 | 12/2012 |
| EP | 2551157 A1 | 1/2013 |
| EP | 2560847 A1 | 2/2013 |
| EP | 2571733 A1 | 3/2013 |
| EP | 2578458 A1 | 4/2013 |
| EP | 2421729 B1 | 3/2014 |
| EP | 2781416 A1 | 9/2014 |
| EP | 2817183 A1 | 12/2014 |
| EP | 2817184 A1 | 12/2014 |
| EP | 002674887-0001 A1 | 2/2015 |
| EP | 2969671 A1 | 1/2016 |
| FR | 2437959 A1 | 4/1980 |
| FR | 2736025 A1 | 1/1997 |
| FR | 2738201 A1 | 3/1997 |
| FR | 2747976 | 10/1997 |
| FR | 2804392 A1 | 8/2001 |
| FR | 2879987 | 6/2006 |
| FR | 2957877 | 9/2011 |
| GB | 1395918 | 5/1975 |
| GB | 1405579 | 9/1975 |
| GB | 2188672 | 10/1987 |
| GB | 2220844 A | 1/1990 |
| GB | 2324237 | 10/1998 |
| GB | 2348118 A | 9/2000 |
| HK | 1110560 | 5/2010 |
| HK | 1105928 | 8/2010 |
| HK | 1108573 | 10/2011 |
| HK | 1110561 | 7/2012 |
| JP | 60092136 A | 5/1985 |
| JP | 0374242 A | 3/1991 |
| JP | 3572527 B2 | 10/2004 |
| JP | 2008037388 A | 2/2008 |
| KR | 10-089115 | 2/2009 |
| KR | 10-0891195 B1 | 4/2009 |
| KR | 20120029616 A | 3/2012 |
| MX | 169141 | 6/1993 |
| MX | 9708272 | 8/1998 |
| MX | 9708273 | 8/1998 |
| MX | PA03010189 | 3/2004 |
| MX | PA03010190 | 3/2004 |
| MX | PA05002760 | 6/2005 |
| MX | PA05002988 | 6/2005 |
| MX | PA05008266 | 9/2005 |
| MX | PA05005581 | 11/2005 |
| MX | PA06008594 | 8/2006 |
| MX | 2007007828 | 7/2007 |
| MX | 2007007829 | 7/2007 |
| MX | 2008012325 | 10/2008 |
| MX | 2008013480 | 10/2008 |
| MX | 2008013814 | 12/2008 |
| MX | 2008014163 | 2/2009 |
| MX | 2009013050 | 1/2010 |
| MX | 2009013051 | 1/2010 |
| MX | 2010009333 | 10/2010 |
| MX | 2011000597 | 3/2011 |
| MX | 2011000598 | 3/2011 |
| MX | 2011003242 | 4/2011 |
| MX | 2011003243 | 4/2011 |
| MX | 2011003911 | 9/2011 |
| MX | 2012002314 | 6/2012 |
| MX | 2013002710 | 5/2013 |
| MX | 2013006881 | 7/2013 |
| MX | 2013006260 A | 12/2013 |
| MX | 2014001106 A | 3/2014 |
| MX | 2013011449 A | 6/2014 |
| MX | 2014001162 A | 7/2014 |
| MX | 2014001161 A | 11/2014 |
| MX | 2014010123 A | 11/2014 |
| MX | 2014010122 A | 5/2015 |
| MX | 2015013210 A | 12/2015 |
| MY | 122308 | 4/2006 |
| MY | 122563 | 4/2006 |
| MY | 128028 | 1/2007 |
| MY | 128970 | 3/2007 |
| PT | 1800978 | 5/2011 |
| PT | 1800977 | 1/2012 |
| PT | 1800977 E | 1/2012 |
| RU | 2238198 | 10/2004 |
| RU | 2251500 | 5/2005 |
| RU | 2260527 | 9/2005 |
| RU | 2260528 | 9/2005 |
| RU | 2268176 | 1/2006 |
| RU | 2271287 | 3/2006 |
| RU | 2293034 | 2/2007 |
| RU | 2294291 | 2/2007 |
| RU | 2007127898 | 1/2009 |
| RU | 80415 | 2/2009 |
| RU | 2346834 | 2/2009 |
| RU | 2369500 | 10/2009 |
| RU | 2381120 | 2/2010 |
| RU | 2394706 | 7/2010 |
| RU | 2416536 C1 | 4/2011 |
| RU | 105237 | 6/2011 |
| RU | 108350 | 9/2011 |
| RU | 108741 | 9/2011 |
| RU | 2456180 C2 | 7/2012 |
| RU | 2493033 C2 | 9/2013 |
| RU | 2526773 C2 | 8/2014 |
| RU | 2543448 C2 | 2/2015 |
| RU | 2560217 C2 | 8/2015 |
| RU | 2560954 C2 | 8/2015 |
| RU | 2561173 C2 | 8/2015 |
| RU | 2577830 C1 | 3/2016 |
| RU | 2577981 C1 | 3/2016 |
| RU | 2578001 C2 | 3/2016 |
| RU | 2015144362 A | 4/2017 |
| TW | M404153 U1 | 5/2011 |
| TW | 201325952 | 7/2013 |
| TW | 201325953 | 7/2013 |
| WO | WO 81/03308 | 11/1981 |
| WO | WO 91/06451 | 5/1991 |
| WO | WO 92/06869 | 4/1992 |
| WO | WO 97/12787 | 4/1997 |
| WO | WO 98/01328 | 1/1998 |
| WO | WO 98/01329 | 1/1998 |
| WO | WO 98/50261 | 11/1998 |
| WO | WO 98/51203 | 11/1998 |
| WO | WO 98/51550 | 11/1998 |
| WO | WO 99/08818 | 2/1999 |
| WO | WO 99/15382 | 4/1999 |
| WO | WO 99/56992 | 11/1999 |
| WO | WO 00/05111 | 2/2000 |
| WO | WO 00/06431 | 2/2000 |
| WO | WO 00/21808 | 4/2000 |
| WO | WO 00/21809 | 4/2000 |
| WO | WO 00/21811 | 4/2000 |
| WO | WO 00/38963 | 7/2000 |
| WO | WO 00/38964 | 7/2000 |
| WO | WO 00/53470 | 9/2000 |
| WO | WO 0061409 | 10/2000 |
| WO | WO 01/26942 | 4/2001 |
| WO | WO 01/30618 | 5/2001 |
| WO | WO 01/40034 | 6/2001 |
| WO | WO 01/49537 | 7/2001 |
| WO | WO 01/58732 | 8/2001 |
| WO | WO 01/62559 | 8/2001 |
| WO | WO 01/89890 | 11/2001 |

(56) References Cited

FOREIGN PATENT DOCUMENTS

| | | |
|---|---|---|
| WO | WO 01/89891 | 11/2001 |
| WO | WO 01/89892 | 11/2001 |
| WO | WO 01/94166 | 12/2001 |
| WO | WO 02/04168 | 1/2002 |
| WO | WO 02/04266 | 1/2002 |
| WO | WO 02/04267 | 1/2002 |
| WO | WO 02/04268 | 1/2002 |
| WO | WO 02/34590 | 5/2002 |
| WO | WO 02/34596 | 5/2002 |
| WO | WO 02/34597 | 5/2002 |
| WO | WO 02/40328 | 5/2002 |
| WO | WO 02/40329 | 5/2002 |
| WO | WO 02/051677 | 7/2002 |
| WO | WO 02/052917 | 7/2002 |
| WO | WO 02/066301 | 8/2002 |
| WO | WO 02/090155 | 11/2002 |
| WO | WO 02/090156 | 11/2002 |
| WO | WO 03/026938 | 4/2003 |
| WO | WO 03/033316 | 4/2003 |
| WO | WO 03/042017 | 5/2003 |
| WO | WO 03/045746 | 6/2003 |
| WO | WO 03/091078 | 11/2003 |
| WO | WO 03/101794 | 12/2003 |
| WO | WO 03/106233 | 12/2003 |
| WO | WO 2004/002792 | 1/2004 |
| WO | WO 2004/045927 | 6/2004 |
| WO | WO 2004/045928 | 6/2004 |
| WO | WO 2004/048163 | 6/2004 |
| WO | WO 2004/056625 | 7/2004 |
| WO | WO 2004/069617 | 8/2004 |
| WO | WO 2004/076251 | 9/2004 |
| WO | WO 2004/098962 | 11/2004 |
| WO | WO 2004/098963 | 11/2004 |
| WO | WO 2004/110833 | 12/2004 |
| WO | WO 2005/025956 | 3/2005 |
| WO | WO 2005/039944 | 5/2005 |
| WO | WO 2008/051483 | 5/2005 |
| WO | WO 2005/054017 | 6/2005 |
| WO | WO 2005/080160 | 9/2005 |
| WO | WO 2005/082691 | 9/2005 |
| WO | WO 2005/087560 | 9/2005 |
| WO | WO 2005/092680 | 10/2005 |
| WO | WO 2005/102801 | 11/2005 |
| WO | WO 2005/115813 | 12/2005 |
| WO | WO 2005/123471 | 12/2005 |
| WO | WO 2006/000393 | 1/2006 |
| WO | WO 2006/013152 | 2/2006 |
| WO | WO 2006/040259 | 4/2006 |
| WO | WO 2006/048355 | 5/2006 |
| WO | WO 2006/061284 | 6/2006 |
| WO | WO 2006/069648 | 7/2006 |
| WO | WO 2006/074995 | 7/2006 |
| WO | WO 2006/079591 | 8/2006 |
| WO | WO 2006/081893 | 8/2006 |
| WO | WO 2006/106006 | 10/2006 |
| WO | WO 2006/106109 | 10/2006 |
| WO | 2006119679 A1 | 11/2006 |
| WO | WO 2006/114355 | 11/2006 |
| WO | WO 2006/117081 | 11/2006 |
| WO | WO 2006/117085 | 11/2006 |
| WO | WO 2006/117308 | 11/2006 |
| WO | WO 2007/009885 | 1/2007 |
| WO | WO 2007/014389 | 2/2007 |
| WO | WO 2007/014395 | 2/2007 |
| WO | WO 2007/035288 | 3/2007 |
| WO | WO 2007/042377 | 4/2007 |
| WO | WO 2007/045549 | 4/2007 |
| WO | WO 2007/071487 | 6/2007 |
| WO | WO 2007/073974 | 7/2007 |
| WO | WO 2007/102404 | 9/2007 |
| WO | WO 2007/122095 | 11/2007 |
| WO | WO 2007/128677 | 11/2007 |
| WO | WO 2008/003633 | 1/2008 |
| WO | WO 2008/043622 | 4/2008 |
| WO | WO 2008/076402 | 6/2008 |
| WO | WO 2008/122453 | 10/2008 |
| WO | WO 2008/124113 | 10/2008 |
| WO | WO 2008/135308 | 11/2008 |
| WO | WO 2009/000498 | 12/2008 |
| WO | WO 2009/115494 | 9/2009 |
| WO | WO 2009/121849 | 10/2009 |
| WO | WO 2009/124792 | 10/2009 |
| WO | WO 2009/132982 | 11/2009 |
| WO | WO 2009/153097 | 12/2009 |
| WO | WO 2009/155230 | 12/2009 |
| WO | WO 2010/016000 | 2/2010 |
| WO | WO 2010/028866 | 3/2010 |
| WO | WO 2010/028918 | 3/2010 |
| WO | WO 2010033646 | 3/2010 |
| WO | WO 2010/034445 | 4/2010 |
| WO | WO 2010/034447 | 4/2010 |
| WO | WO 2010/035794 | 4/2010 |
| WO | WO 2010/091757 | 8/2010 |
| WO | WO 2010/098877 | 9/2010 |
| WO | WO 2010/112579 | 10/2010 |
| WO | WO 2010/121665 | 10/2010 |
| WO | 2010127888 A1 | 11/2010 |
| WO | WO 2011/032753 | 3/2011 |
| WO | WO 2011/032760 | 3/2011 |
| WO | WO 2011/040743 | 4/2011 |
| WO | WO 2011/060979 | 5/2011 |
| WO | WO 2011/116995 | 9/2011 |
| WO | WO 2011/120723 | 10/2011 |
| WO | WO 2011/124404 | 10/2011 |
| WO | WO 2011/131395 | 10/2011 |
| WO | WO 2011/144400 | 11/2011 |
| WO | WO 2011/157465 | 12/2011 |
| WO | WO 2012/001175 | 1/2012 |
| WO | WO 2012/014054 | 2/2012 |
| WO | WO 2012/033363 | 3/2012 |
| WO | 2013/016493 A1 | 1/2013 |
| WO | 2013/019645 A1 | 2/2013 |
| WO | 2013/019723 A1 | 2/2013 |
| WO | 2013089312 A1 | 6/2013 |
| WO | 2013/126907 A1 | 8/2013 |
| WO | 2013/126910 A1 | 8/2013 |
| WO | 2013/176352 A1 | 11/2013 |
| WO | 2014/145538 A1 | 9/2014 |
| WO | 2016/160687 A1 | 10/2016 |
| WO | 2017/075066 A1 | 5/2017 |
| WO | 2017/201458 A1 | 11/2017 |
| WO | 2017/201464 A1 | 11/2017 |
| WO | 2017/201470 A1 | 11/2017 |
| WO | 2017/201473 A1 | 11/2017 |
| WO | 2017/201485 A1 | 11/2017 |
| ZA | 199710009 | 7/1999 |
| ZA | 199806124 | 3/2000 |
| ZA | 199806125 | 3/2000 |
| ZA | 199807523 | 4/2000 |
| ZA | 200006220 B | 7/2001 |
| ZA | 199806123 | 3/2003 |

OTHER PUBLICATIONS

International Search Report dated Oct. 19, 2012 for PCT/US2012/048843 filed Jul. 30, 2012.
International Search Report dated Sep. 19, 2012 for PCT/US2012/048617 filed Jul. 27, 2012.
International Search Report dated Sep. 19, 2012 for PCT/US2012/048262 filed Jul. 26, 2012.
Non-Final Rejection towards U.S. Appl. No. 13/453,601 dated Jul. 9, 2013.
Non-Final Rejection towards U.S. Appl. No. 13/453,601 dated Jan. 10, 2014.
Final Rejection towards U.S. Appl. No. 13/453,601 dated Aug. 1, 2014.
Non-Final Rejection towards U.S. Appl. No. 13/453,601 dated Feb. 4, 2015.
Final Rejection towards U.S. Appl. No. 13/453,601 dated Jun. 3, 2015.
Non-Final Rejection towards U.S. Appl. No. 13/453,601 dated Jan. 8, 2016.

(56) References Cited

OTHER PUBLICATIONS

Notice of Allowance towards U.S. Appl. No. 13/453,601 dated May 20, 2016.
Non-Final Rejection towards U.S. Appl. No. 13/558,624 dated May 16, 2014.
Final Rejection towards U.S. Appl. No. 13/558,624 dated Sep. 29, 2014.
Non-Final Rejection towards U.S. Appl. No. 13/558,624 dated Mar. 6, 2015.
Notice of Allowance towards U.S. Appl. No. 13/558,624 dated Jun. 29, 2015.
Non-Final Rejection towards U.S. Appl. No. 13/560,585 dated Jul. 29, 2014.
Final Rejection towards U.S. Appl. No. 13/560,585 dated Jan. 28, 2015.
Non-Final Rejection towards U.S. Appl. No. 13/560,585 dated Jun. 24, 2015.
Notice of Allowance towards U.S. Appl. No. 13/560,585 dated Mar. 22, 2016.
Non-Final Rejection towards U.S. Appl. No. 13/679,646 dated Feb. 2, 2015.
Final Rejection towards U.S. Appl. No. 13/679,646 dated Sep. 2, 2015.
Non-Final Rejection towards U.S. Appl. No. 13/679,646 dated Jun. 13, 2016.
Non-Final Rejection towards U.S. Appl. No. 13/679,646 dated Jan. 4, 2017.
Non-Final Rejection towards U.S. Appl. No. 13/572,100 dated Jun. 3, 2014.
Non-Final Rejection towards U.S. Appl. No. 13/587,389 dated Oct. 31, 2014.
Final Rejection towards U.S. Appl. No. 13/587,389 dated Feb. 25, 2015.
Notice of Allowance towards U.S. Appl. No. 13/587,389 dated Jun. 19, 2015.
Non-Final Rejection towards U.S. Appl. No. 14/928,467 dated Apr. 28, 2016.
Final Rejection towards U.S. Appl. No. 14/928,467 dated Sep. 14, 2016.
Non-Final Rejection towards U.S. Appl. No. 13/194,070 dated Apr. 8, 2013.
Final Rejection towards U.S. Appl. No. 13/194,070 dated Aug. 27, 2013.
Non-Final Rejection towards U.S. Appl. No. 13/194,070 dated Dec. 26, 2013.
Notice of Allowance towards U.S. Appl. No. 13/194,070 dated Apr. 18, 2014.
Non-Final Rejection towards U.S. Appl. No. 14/329,423 dated Sep. 10, 2014.
Notice of Allowance towards U.S. Appl. No. 14/329,423 dated Apr. 15, 2015.
Non-Final Rejection towards U.S. Appl. No. 29/413,428 dated Nov. 7, 2012.
Notice of Allowance towards U.S. Appl. No. 29/413,428 dated Jun. 14, 2013.
Notice of Allowance towards U.S. Appl. No. 29/413,430 dated Nov. 26, 2012.
Non-Final Rejection towards U.S. Appl. No. 29/375,477 dated Sep. 7, 2012.
Notice of Allowance towards U.S. Appl. No. 29/375,477 dated Jan. 15, 2014.
Notice of Allowance towards U.S. Appl. No. 29/429,262 dated Jun. 27, 2013.
Non-Final Rejection towards U.S. Appl. No. 13/776,376 dated Nov. 18 2014.
Non-Final Rejection towards U.S. Appl. No. 13/840,256 dated Nov. 26 2014.
Non-Final Rejection towards U.S. Appl. No. 14/715,180 dated Jan. 7, 2016.
Final Rejection towards U.S. Appl. No. 14/715,180 dated Jan. 7, 2016.
Definition of rectangular in Oxford Dictionary 2017.
Non-Final Rejection towards U.S. Appl. No. 14/715,180 dated May 22, 2017.
Non-Final Rejection towards U.S. Appl. No. 14/721,476 dated May 16, 2017.
International Search Report and Written Opinion issued in PCT Application No. PCT/US2013/027684 dated Apr. 29, 2013.
International Search Report and Written Opinion issued in PCT Application No. PCT/US2014/030329 dated Jun. 3, 2014.
First Office Action issued in connection with CA Application No. 2865292 dated Aug. 25, 2015.
Second Office Action issued in connection with CA Application No. 2865292 dated Aug. 15, 2016.
Non-Final Rejection towards U.S. Appl. No. 13/776,383 dated Mar. 10, 2015.
Final Rejection towards U.S. Appl. No. 13/776,383 dated Aug. 14, 2015.
International Search Report and Written Opinion issued in PCT Application No. PCT/US2013/027688 dated Apr. 25, 2013.
First Office Action issued in connection with CA Application No. 2865295 dated Aug. 25, 2015.
Non-Final Rejection towards U.S. Appl. No. 14/216,082 dated Apr. 12, 2017.
Non-Final Rejection towards U.S. Appl. No. 14/200,792 dated Oct. 23, 2015.
Final Rejection towards U.S. Appl. No. 14/200,792 dated Feb. 23, 2016.
Notice of Allowance issued towards U.S. Appl. No. 14/200,792 dated Jul. 22, 2016.
Non-Final Rejection towards U.S. Appl. No. 15/359,271 dated May 11, 2017.
Notice of Allowance issued towards U.S. Appl. No. 29/504,287 dated Sep. 12, 2016.
Non-Final Rejection towards U.S. Appl. No. 29/504,292 dated Jun. 19, 2015.
Final Rejection towards U.S. Appl. No. 29/504,292 dated Jan. 20, 2016.
Advisory Action towards U.S. Appl. No. 29/504,292 dated May 19, 2016.
Notice of Allowance issued towards U.S. Appl. No. 29/504,292 dated Aug. 16, 2016.
International Search Report and Written Opinion issued in PCT Application No. PCT/US2016/024490 dated Jun. 21, 2016.
Notice of Allowance issued towards U.S. Appl. No. 29/525,746 dated Apr. 7, 2016.
Notice of Allowance issued towards U.S. Appl. No. 29/571,419 dated Jan. 31, 2017.
Notice of Allowance issued towards U.S. Appl. No. 29/571,424 dated Feb. 1, 2017.
International Search Report and Written Opinion issued in PCT Application No. PCT/US2016/058887 dated Jan. 3, 2017.
"DuPont Wiper Blade Installation: Trapezoid Arm Style," Pylon Manufacturing Corp., dated Jan. 1, 2015, Retrieved from the Internet URL: http://http://windshield-wiperblades.com/resources?do=installation_removal&country=United%20States#, on Jul. 28, 2017, pp. 1-2.
"First Time Fit Wiper Blades: Top Lock 1 Connector Wiper Blade Installation Instructions" DENSO Auto Parts, Retrieved from the Internet URL: http://densoautoparts.com/wiper-blades-first-time-fit-wiper-blades.aspx#undefined, on Jul. 28, 2017, pp. 1-3.
Final Rejection towards U.S. Appl. No. 13/679,646 dated Jul. 14, 2017.
Non-Final Rejection towards U.S. Appl. No. 14/715,144 dated Nov. 15, 2017.
International Search Report and Written Opinion issued in PCT Application No. PCT/US2017/033622 dated Aug. 11, 2017.
International Search Report and Written Opinion issued in PCT Application No. PCT/US2017/033629 dated Aug. 22, 2017.
International Search Report and Written Opinion issued in PCT Application No. PCT/US2017/033640 dated Aug. 23, 2017.

(56) References Cited

OTHER PUBLICATIONS

International Search Report and Written Opinion issued in PCT Application No. PCT/US2017/033657 dated Sep. 28, 2017.
International Search Report and Written Opinion issued in PCT Application No. PCT/US2017/033643 dated Oct. 2, 2017.

* cited by examiner

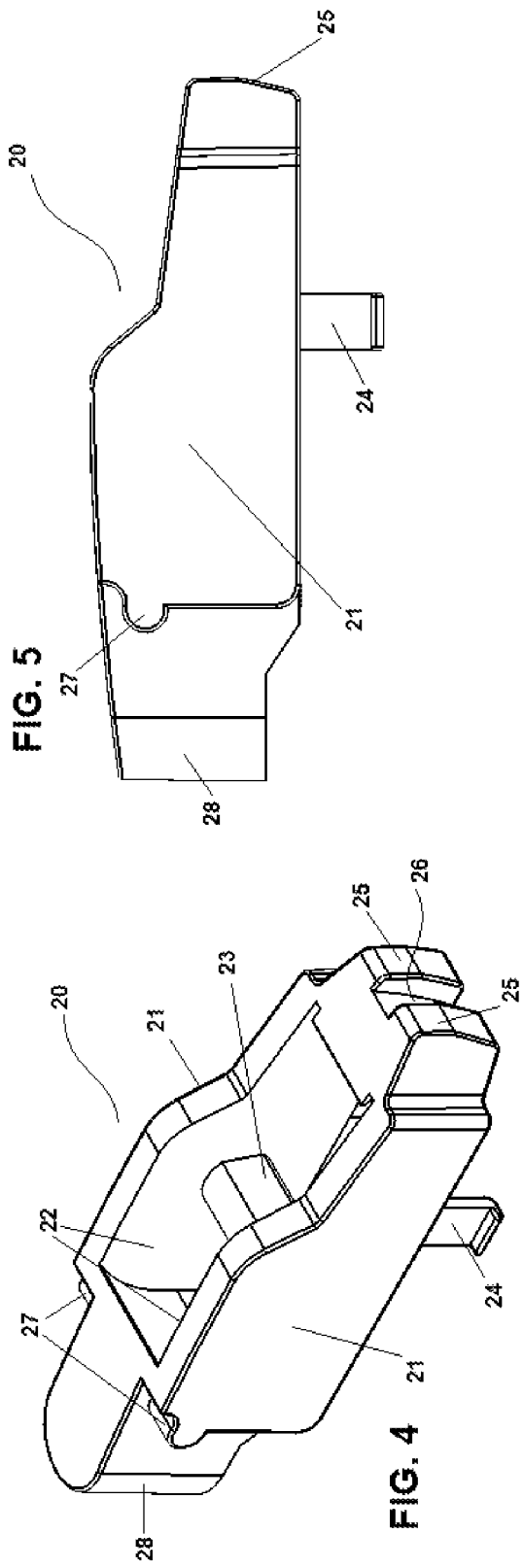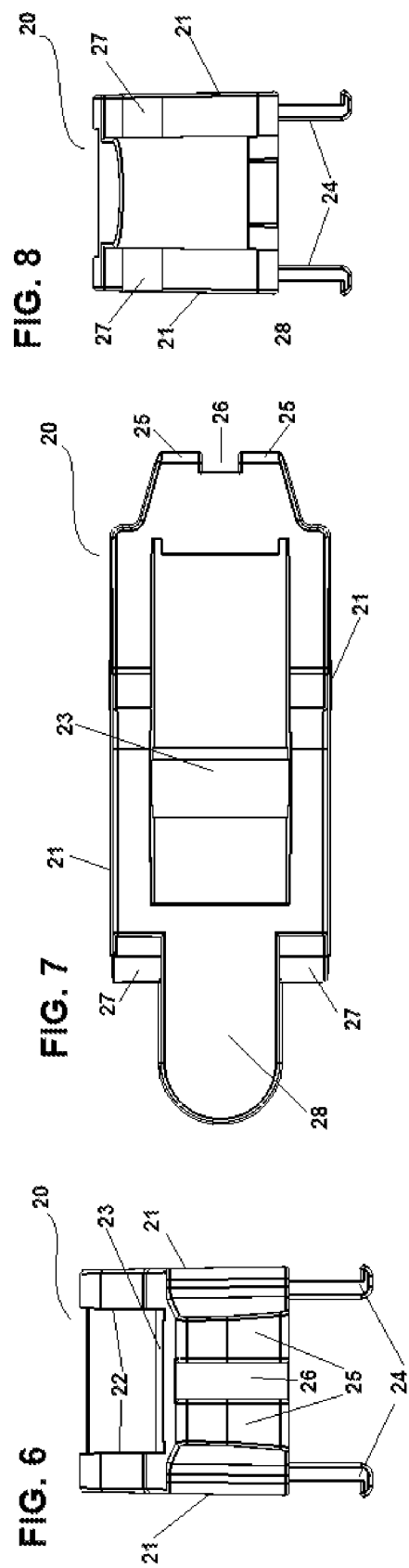

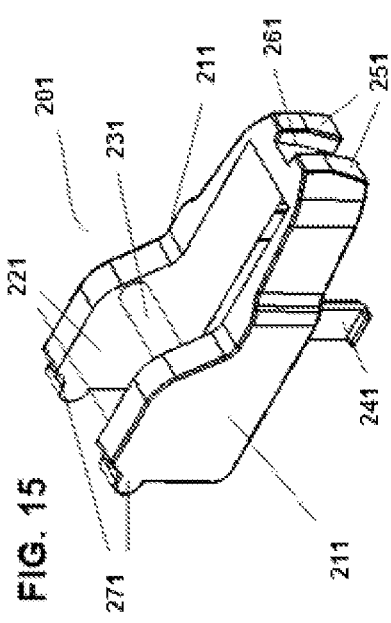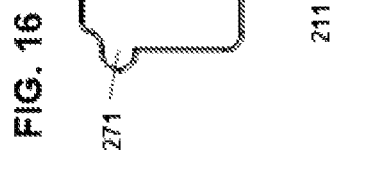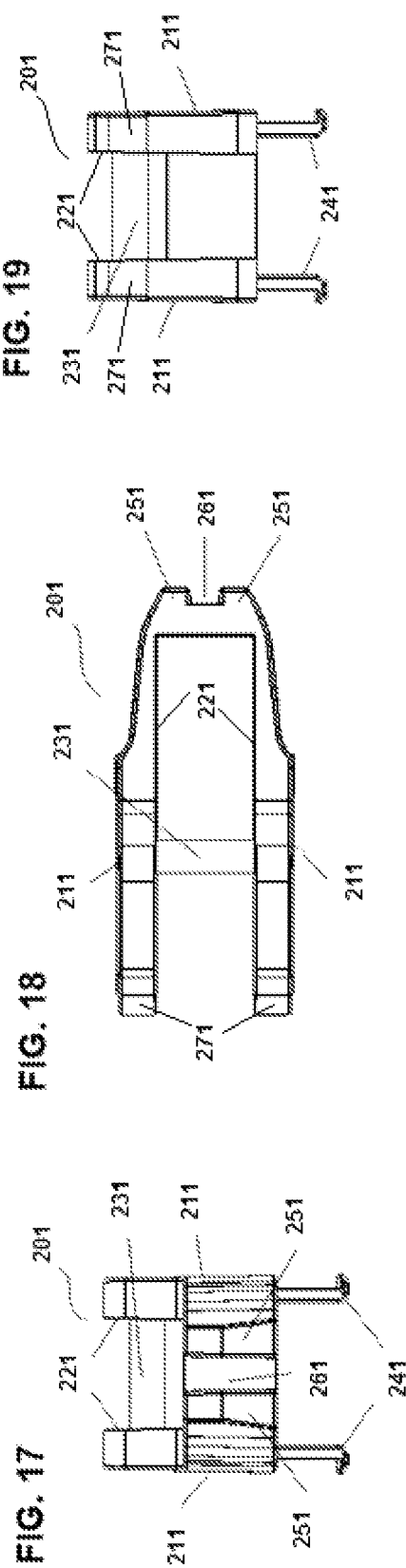

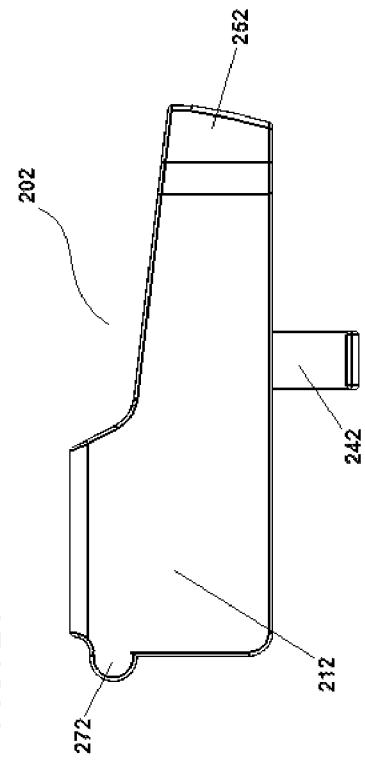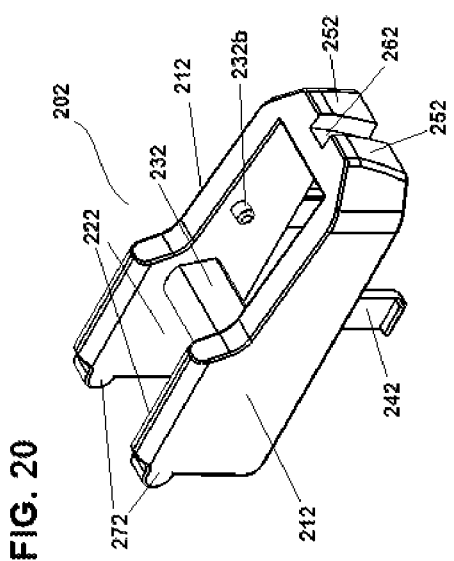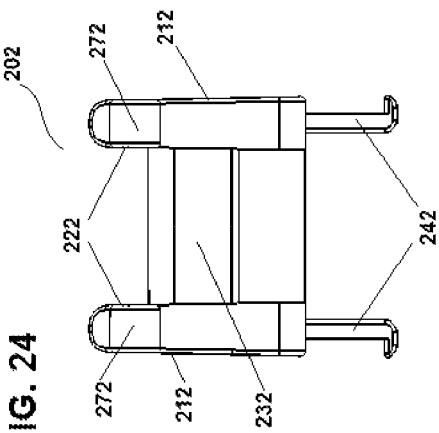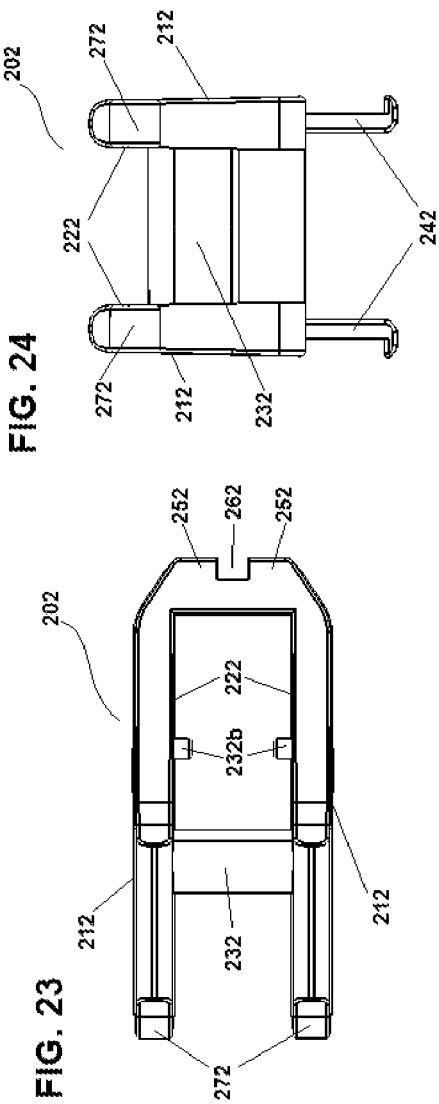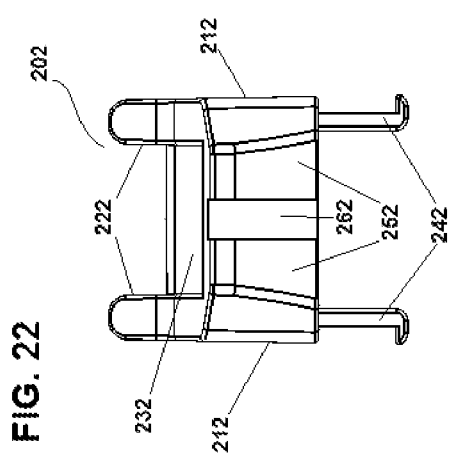

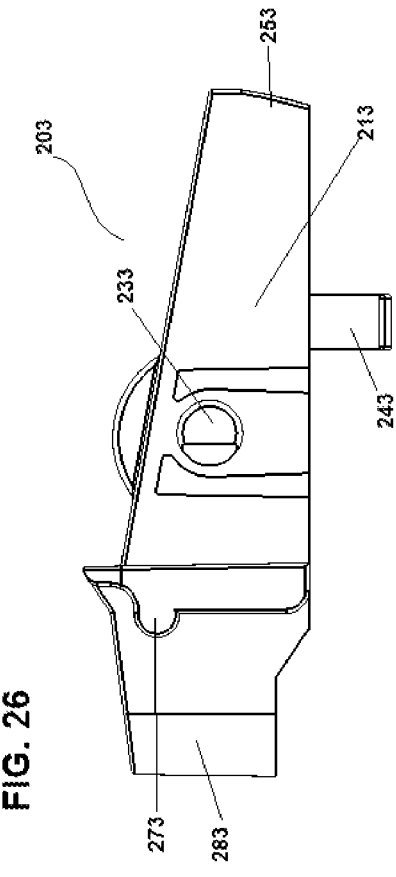
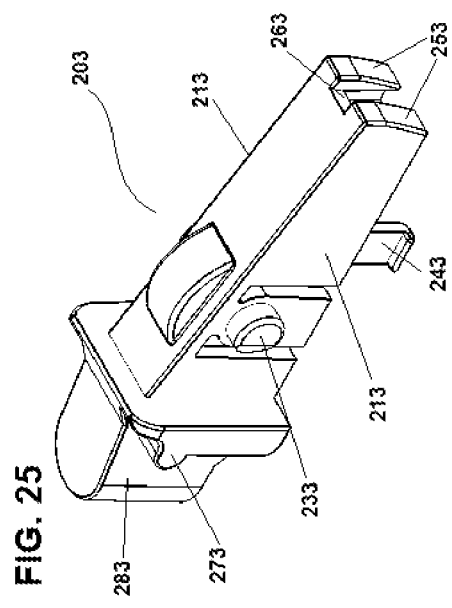
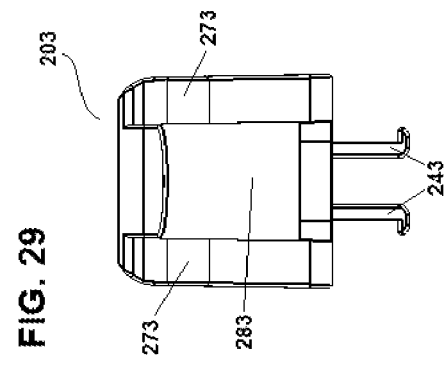
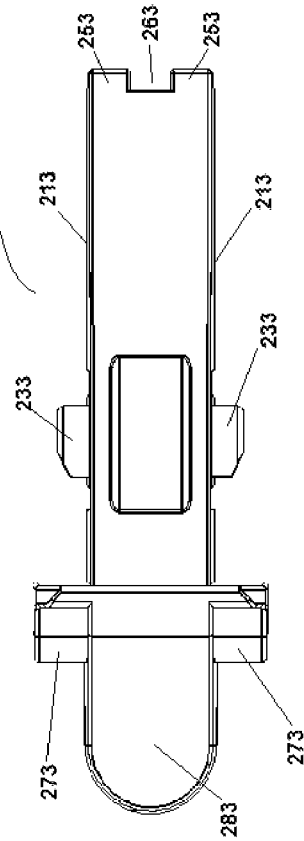
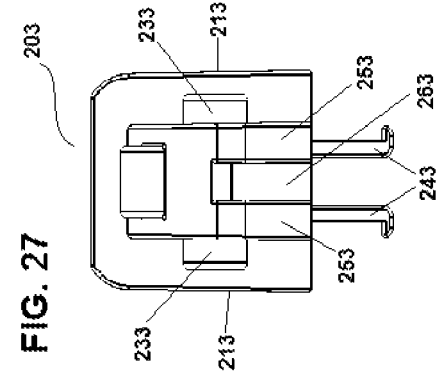

WIPER BLADE WITH MODULAR MOUNTING BASE

CROSS REFERENCE TO RELATED APPLICATIONS

This application claims the benefit of U.S. Provisional Application No. 61/704,855 filed Sep. 24, 2012, the disclosure of which is hereby incorporated herein by reference in its entirety.

BACKGROUND AND FIELD OF ART

The invention is generally directed to wiper blades, and in particular to rear wiper blades. Vehicles in the United States and abroad use a variety of different wiper arms to secure windshield wipers. The same is true for wiper arms designed for the rear windows of certain cars. Accordingly aftermarket manufacturers, who sell wiper blades that may be installed on a variety of different cars arms need to provide wiper blades that can connect to various types of wiper arms.

One solution to this problem is the use of multi-arm connectors, such as the one described and claimed in U.S. Pat. No. 6,640,380. Another solution more popular with rear wiper arms is to have a removable mounting base capable of connecting directly to a wiper arm without the use of a separate connector. The invention disclosed provides a novel wiper blade and detachable mounting base system providing a cost-efficient and reliable connection between a variety of wiper blade arms and the novel wiper blade.

BRIEF DESCRIPTION OF THE DRAWINGS

FIG. 4 illustrates a perspective view of the mounting base depicted in FIG. 1.

FIG. 5 illustrates a side view of the mounting base depicted in FIG. 4.

FIG. 6 illustrates a view of the proximal end of the mounting base depicted in FIG. 4.

FIG. 7 illustrates a top view of the mounting base depicted in FIG. 4.

FIG. 8 illustrates a view of the distal end of the mounting base depicted in FIG. 4.

FIG. 15 illustrates a perspective view of a mounting base of a second exemplary embodiment of the invention.

FIG. 16 illustrates a side view of the mounting base depicted in FIG. 15.

FIG. 17 illustrates a view of the proximal end of the mounting base depicted in FIG. 15.

FIG. 18 illustrates a top view of the mounting base depicted in FIG. 15.

FIG. 19 illustrates a view of the distal end of the mounting base depicted in FIG. 15.

FIG. 20 illustrates a perspective view of a mounting base of a third exemplary embodiment of the invention.

FIG. 21 illustrates a side view of the mounting base depicted in FIG. 20.

FIG. 22 illustrates a view of the proximal end of the mounting base depicted in FIG. 20.

FIG. 23 illustrates a top view of the mounting base depicted in FIG. 20.

FIG. 24 illustrates a view of the distal end of the mounting base depicted in FIG. 20.

FIG. 25 illustrates a perspective view of a mounting base of a fourth exemplary embodiment of the invention.

FIG. 26 illustrates a side view of the mounting base depicted in FIG. 25.

FIG. 27 illustrates a view of the proximal end of the mounting base depicted in FIG. 25.

FIG. 28 illustrates a top view of the mounting base depicted in FIG. 25.

FIG. 29 illustrates a view of the distal end of the mounting base depicted in FIG. 25.

DETAILED DESCRIPTION

The following detailed description and the appended drawings describe and illustrate exemplary embodiments of the invention solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

Figure 1:
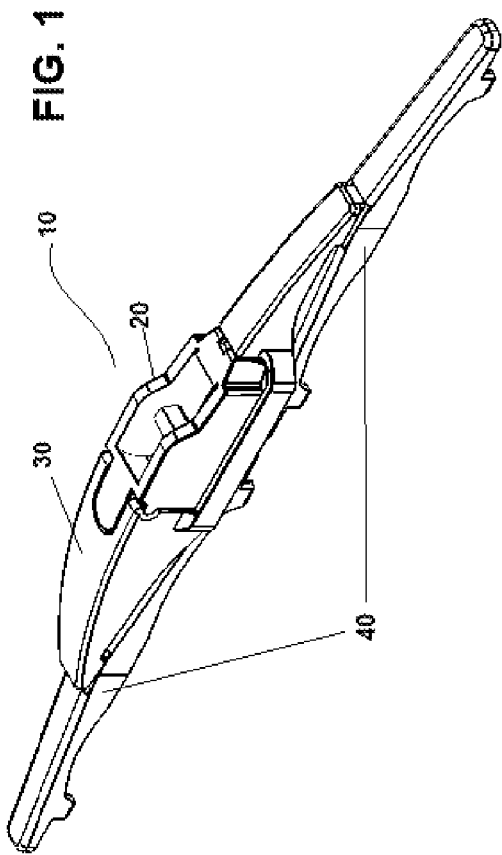
FIG. 1 illustrates perspective view of a wiper assembly of a first exemplary embodiment of the invention.
Figure 2:
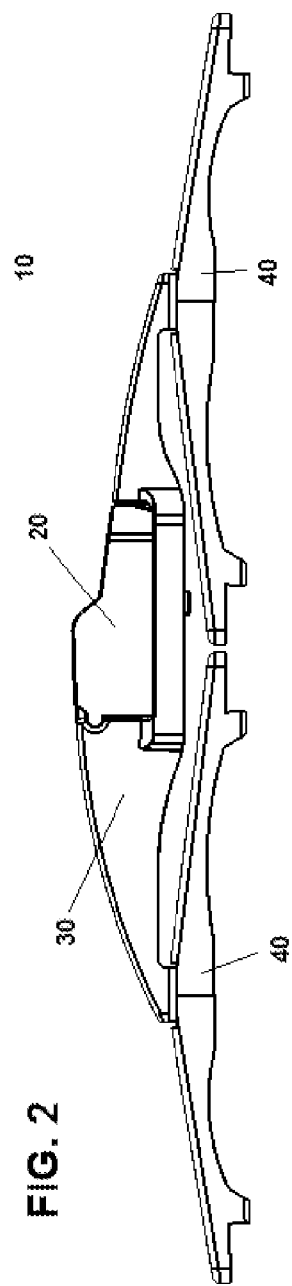
FIG. 2 illustrates a frontal view of the wiper blade assembly depicted in FIG. 1.
Figure 3:
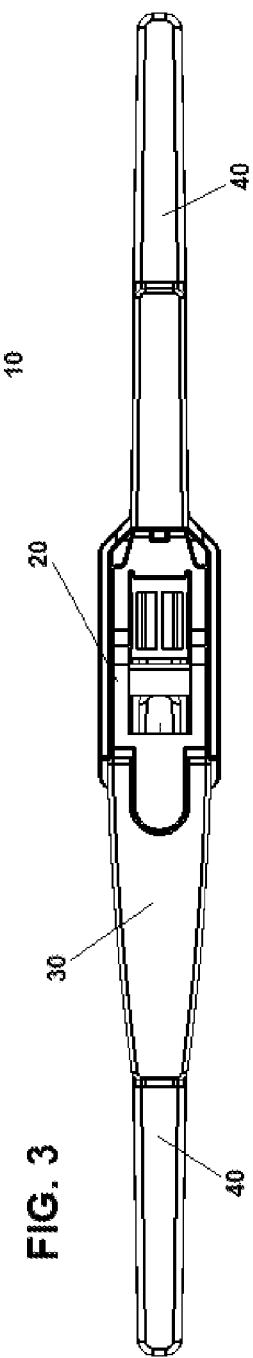
FIG. 3 illustrates a top view of the wiper blade assembly depicted in FIG. 1.

The invention is generally directed to a novel wiper blade designed so as to have modular mounting bases that can be attached as needed to connect to various types of wiper arms. Note that any particular embodiment may include one or more of such mounting bases which can interchangeably attach to the primary frame as described below. FIGS. 1-3 depict a wiper blade assembly 10 of a first exemplary embodiment of the invention. The wiper 10 has a mounting base 20, a primary frame 30, secondary frames 40 and a wiper strip (not shown). Optionally, one or more tertiary frames may further be attached to the secondary frames 40 between the secondary frame 40 and the wiper strip.

FIGS. 4-8 illustrate a first exemplary embodiment of a mounting base 20. The mounting base 20 is preferably made of plastic, though any other suitable material known in the art may be used for same. The mounting base 20 has a proximal end having two retaining projections 25 with a guiding channel 26 therebetween. The guiding channel 26 receives a projection 36 from the primary frame 30, and the retaining projections 25 sit on either side of the projection 36 when the mounting base 20 is attached. The retaining projections 25 may be chamfered, as shown in FIGS. 4 & 5 to facilitate the attachment of the mounting base 20 to the primary frame 30. Additional retaining projections 25 and guiding channels may also be used. Indeed, in some embodiments the guiding channel and primary frame 30 may instead be located on the primary frame 30, and projection may be located on the mounting base 20 (and may be chamfered for ease of installation).

The mounting base 20 also has one or more locking legs 24 which descend from the bottom of the mounting base 20 to engage one or more receiving holes 34 in the primary frame 30 of the wiper blade 10. Where more than one locking leg is used, the width between, and positioning of, the locking legs may vary and should be complementary to the positioning and spacing of the receiving holes 34 in the primary frame 30. The mounting base 20 also has one or more locking projections 27 on its distal end which engage locking recesses 37 on the primary frame 30 of the wiper blade 10.

The mounting base 20 further has outer side walls 21. In some embodiments, such as the first exemplary embodiment, and the embodiments depicted in FIGS. 15-24, the mounting base may also have inner side walls 22. In order to connect to a wiper arm, the mounting base 20 may be provided with a connecting device which interfaces with structure on a wiper arm. As shown in FIGS. 4-8, the connection device in mounting base 20 is a rivet 23, extending between the two inner side walls 22. The rivet is capable of engaging a rivet passage or clip in a wiper arm, thereby securing the wiper blade 10 to the wiper arm. Other types of connecting devices, such as rivets of various different sizes, projections, recesses, pegs, detents, and other such known methods of connecting to a wiper arm (some of which are described below) can be used within the scope of the disclosed concepts to secure a wiper arm to the wiper blade provided.

The mounting base 20 may further have a distal projection 28 as illustrated in FIGS. 4-8. The distal projection 28 is received by a cutout 38, which is preferably has a shape complementary to that of the distal projection. The distal projection 28 provides additional lateral and transverse support for the connection between the mounting base 20 and the primary frame 30. In some embodiments the distal projection 28 and the cutout 38 may be swapped such that the mounting base 20 has a distal cutout 38, and the primary frame 30 has a second projection which engages the cutout in the mounting base 20.

Figure 10:
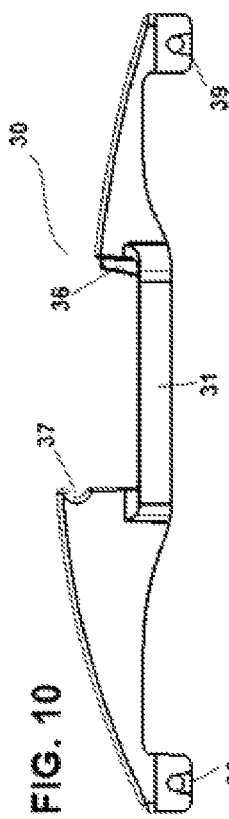
FIG. 10 illustrates a frontal view of the primary frame depicted in FIG. 9.
Figure 11:
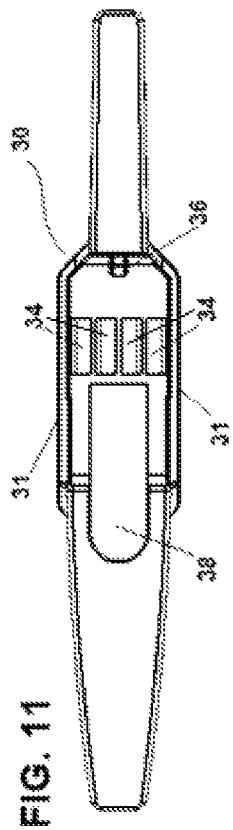
FIG. 11 illustrates a top view of the primary frame depicted in FIG. 9.
Figure 9:
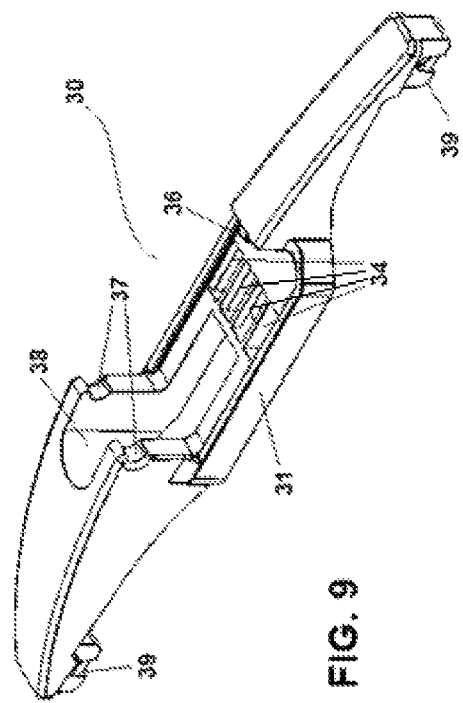
FIG. 9 illustrates a perspective view of the primary frame depicted in FIG. 1.

FIGS. 9-11 illustrate a primary frame 30 of the wiper blade 10. The primary frame has two legs, which may be symmetrical (not shown) or asymmetrical (as shown in FIGS. 9-11). Each of the legs of the primary frame 30 have frame connection devices at or near their respective outer ends which engage complementary frame connection devices in the secondary frame. As shown in FIGS. 9 and 10, the frame connection devices may be frame connection holes 39 which engage interior pegs 49 in the secondary frames 40. In addition to pegs 49 and frame connection holes 39, the frame connection devices and complementary frame connection devices can be any such structures known in the art, including rivets and rivet passages or clips, detents or projections and recesses or holes, etc. Alternatively, the primary frame may have claws or other such structures known in the art that are capable of securing a wiper strip directly without the need for secondary frames.

The primary frame also may have a base portion 31 which receives and supports the mounting base 20. The base portion may have one or more receiving holes 34 located so as to receive the locking legs 24 of the mounting base 20. The primary frame may also have a projection 36 which is located between the retaining projections 25 of the mounting base 20. As discussed above, the retaining projections 25 and the projection 36 may be swapped onto the primary frame 30 and mounting base 20 respectively within the scope of the disclosed concept.

The primary frame 30 may also have one or more locking recesses 37 to receive and engage locking projections 27 on the mounting base 20. The locking recesses 37 are preferably shaped to complement and receive the locking projections 27 snugly, but any suitable shape which engages the locking projections 27 would be suitable for the locking recesses 37.

As discussed above, the primary frame 30 may also be provided with a cutout 38 which receives the distal projection 28 of a mounting base 20 when the mounting base 20 is secured to the primary frame 30.

Figure 13:
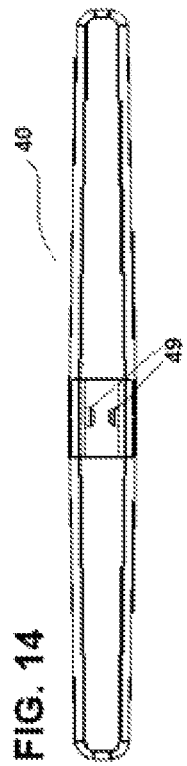
FIG. 13 illustrates a side view of the secondary frame depicted in FIG. 12.
Figure 14:
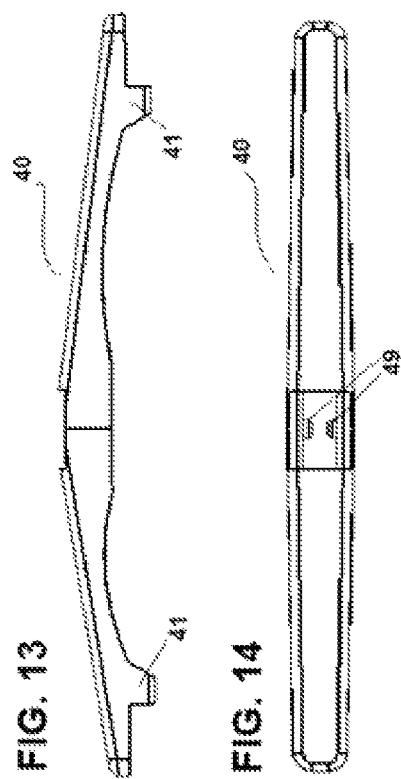
FIG. 14 illustrates a top view of the secondary frame depicted n FIG. 12.
Figure 12:
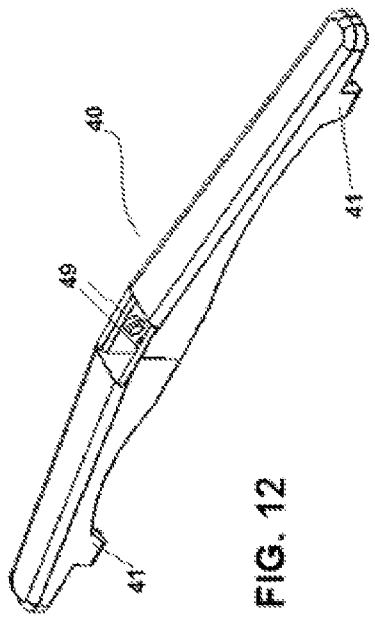
FIG. 12 illustrates a perspective view of a secondary frame depicted in FIG. 1.

FIGS. 12-14 illustrate a secondary frame 40 for the wiper blade 10. The secondary frames 40 may be symmetrical (not shown) or asymmetric, as shown in FIGS. 12-14. The secondary frame may have a complementary frame connection device, such as the interior pegs 49 shown in FIGS. 12 and 14 in its central area in order to attach to the frame connection device in the primary frame 30. For example, the interior pegs 49 engage the frame connection holes 39 in the primary frame. The secondary frame 40 may also have claws 41 or any other wiper strip securing device known in the industry to hold a wiper strip. Alternatively, the secondary frame may have frame connection devices on its ends that engage complementary frame connection devices in tertiary frames instead of directly securing the wiper strip. The secondary frame is preferably made from plastic, but can be made from metal or any other suitable material known in the art.

A second exemplary embodiment of the mounting base 201 is illustrated in FIGS. 15-19. The mounting base 201 has a proximal end having two retaining projections 251 with a guiding channel 261 therebetween. The retaining projections 251 may be chamfered, as shown in FIGS. 15 & 16 to facilitate the attachment of the mounting base 201 to the primary frame 30. The mounting base 201 also has to locking legs 241 which descend from the bottom of the mounting base 201 to engage receiving holes 34 in the primary frame 30 of the wiper blade 10. The mounting base 201 also has locking projections 271 on its distal end which engage locking recesses 37 on the primary frame 30 of the wiper blade 10. The mounting base 201 further has outer side walls 211.

The connection device in mounting base 201 is also a rivet 231, extending between the two inner side walls 221. However the rivet 231 in the second exemplary embodiment has a smaller radius than the rivet 23 depicted in the first exemplary embodiment. Also, unlike the first exemplary embodiment, the mounting base 201 depicted in FIGS. 15-19 does not have the optional distal projection 28 present in the mounting base 20 depicted in FIGS. 4-8.

A third exemplary embodiment of the mounting base 202 is illustrated in FIGS. 20-24. The mounting base 202 has a proximal end having two retaining projections 252 with a guiding channel 262 therebetween. The retaining projections 252 may be chamfered, as shown in FIGS. 20 & 21 to facilitate the attachment of the mounting base 202 to the primary frame 30. The mounting base 202 also has to locking legs 242 which descend from the bottom of the mounting base 202 to engage receiving holes 34 in the primary frame 30 of the wiper blade 10. The mounting base 202 also has locking projections 272 on its distal end which engage locking recesses 37 on the primary frame 30 of the wiper blade 10. The mounting base 202 further has outer side walls 212.

The connection device in mounting base 202 comprises both a rivet 232 extending between the two inner side walls 222, and interior projections 232b projecting from the inner side walls of 222. However the rivet 232 in the second exemplary embodiment has a smaller radius than the rivet 23 depicted in the first exemplary embodiment. Also, unlike the first exemplary embodiment, the mounting base 202 depicted in FIGS. 20-24 does not have the optional distal projection 28 present in the mounting base 20 depicted in FIGS. 4-8.

A fourth exemplary embodiment of the mounting base 203 is illustrated in FIGS. 25-29. The mounting base 203 has a proximal end having two retaining projections 253 with a guiding channel 263 therebetween. The retaining projections 253 may be chamfered, as shown in FIGS. 25 & 26 to facilitate the attachment of the mounting base 203 to the primary frame 30. The mounting base 203 also has to locking legs 243 which descend from the bottom of the mounting base 203 to engage receiving holes 34 in the primary frame 30 of the wiper blade 10. As shown in FIGS. 27 and 29, the mounting base 203 has a narrower distance between the locking legs, and engage the interior receiving holes 34 of the primary frame 30 (unlike mounting bases 20, 201 & 202 in the previous exemplary embodiments, which engage the outer receiving holes 34 of the primary frame 30). The mounting base 203 also has locking projections 273 on its distal end which engage locking recesses 37 on the primary frame 30 of the wiper blade 10. Like the first exemplary embodiment, the mounting base 203 depicted in FIGS. 25-29 has not have the optional distal projection.

The mounting base 203 further has outer side walls 213. Unlike the mounting bases 20, 201 & 202 in the previous exemplary embodiments, the outer side walls 213 of the mounting base 203 in the fourth exemplary embodiment are recessed, such that the wiper arm connecting to the mounting base 203 will cover the outer walls 213 of the mounting base 203. Accordingly, the connection device in mounting base 203 comprises both a peg projections 233 extending outwardly from the two outer side walls 213. The pegs 233 may be located on cantilevered portions of the side walls, as shown in FIGS. 25 and 26, and may further be chamfered in order to facilitate connection to a wiper arm (not shown). Accordingly, the pegs 233 are capable of interacting with and fitting inside holes or recesses in a wiper arm in order to secure the wiper blade to the wiper arm.

As discussed above, the descriptions of the exemplary embodiments set forth above are meant to be illustrative of the disclosed concepts, and are not intended to be limiting in any way. Any method of connecting a wiper arm to a mounting base, including the use of rivets, projections, recesses, clips, connectors and adaptors can be practiced together with the concepts disclosed in this application.

We claim:

1. A wiper blade comprising:
    a wiper strip;
    a primary frame coupled to at least one secondary frame, the primary frame having a recessed portion, wherein the recessed portion has a base portion, a proximal end and a distal end, a projection is disposed on the proximal end of the recessed portion, and at least one receiving hole is disposed in the base portion of the recessed portion; and
    a mounting base having bottom, a proximal end and a distal end, wherein at least one locking leg descends from the bottom of the mounting base such that the at least one receiving hole in the base portion of the recessed portion of the primary frame is capable of receiving the at least one locking leg when the mounting base is attached to the primary frame, wherein the at least one locking leg each comprises a bottom edge comprising locking tabs extending laterally from the bottom edge, and
    wherein the proximal end comprises two retaining projections and a guiding channel therebetween, wherein the guiding channel is capable of receiving the projection from the primary frame such that the retaining projections sit on either side of the projection on the primary frame when the mounting base is attached to the primary frame.

2. The wiper blade of claim 1, wherein the retaining projections are chamfered.

3. The wiper blade of claim 1 wherein the primary frame further comprises at least one locking recess on the distal end of the recessed portion of the primary frame, and the mounting base has at least one locking projection on the distal end of the mounting base which is capable of engaging the at least one locking recess when the mounting base is attached to the primary frame.

4. The wiper blade of claim 1 wherein the primary frame further comprises a distal cutout disposed on the distal end of the recessed portion.

5. The wiper blade of claim 1, wherein the mounting base further comprises inner and outer side walls, wherein the mounting base has a connecting structure that is capable of connecting to a wiper arm selected from the group consisting of: a rivet extending between the inner side walls, at least one interior projection extending from the inner side walls, a rivet extending between the inner side walls and at least one interior projection extending from the inner side walls, at least one peg extending from the inner side walls, at least one recess in the inner side walls, at least one hole in the inner side walls and at least one detent in the inner side walls.

6. The wiper blade of claim 1, wherein the mounting base further comprises outer side walls wherein the mounting base has a connecting structure that is capable of connecting to a wiper arm selected from the group consisting of: at least one outer projection extending from the outer side walls, at least one peg extending from the outer side walls, at least one recess in the outer side walls, at least one hole in the outer side walls and at least one detent in the outer side walls.

* * * * *